US012700292B2

(12) United States Patent
Subramanian et al.

(10) Patent No.: US 12,700,292 B2
(45) Date of Patent: Aug. 4, 2026

(54) RADIO FREQUENCY IDENTIFICATION (RFID) TAG STRAY ALARM MITIGATION

(71) Applicant: Sensormatic Electronics, LLC, Boca Raton, FL (US)

(72) Inventors: Gopi Subramanian, Delray Beach, FL (US); Harish Yadav, Boca Raton, FL (US); Harshaa N. Bajaj, Boca Raton, FL (US); Cory Root, Delray Beach, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 309 days.

(21) Appl. No.: 18/265,642

(22) PCT Filed: Jan. 28, 2022

(86) PCT No.: PCT/US2022/070420
§ 371 (c)(1),
(2) Date: Jun. 6, 2023

(87) PCT Pub. No.: WO2022/165523
PCT Pub. Date: Aug. 4, 2022

(65) Prior Publication Data
US 2024/0046766 A1 Feb. 8, 2024

Related U.S. Application Data

(60) Provisional application No. 63/144,822, filed on Feb. 2, 2021, provisional application No. 63/144,777, filed
(Continued)

(51) Int. Cl.
G08B 13/24 (2006.01)
G06N 20/20 (2019.01)

(52) U.S. Cl.
CPC ......... G08B 13/2417 (2013.01); G06N 20/20 (2019.01); G08B 13/2485 (2013.01); G08B 13/2488 (2013.01)

(58) Field of Classification Search
CPC ............ G08B 13/2417; G08B 13/2485; G08B 13/2488; G06N 20/20
See application file for complete search history.

(56) References Cited

U.S. PATENT DOCUMENTS 10,586,082 B1 * 3/2020 Tang ..................... G06N 20/00
2020/0226333 A1 * 7/2020 Riggert .............. G06K 7/10425

FOREIGN PATENT DOCUMENTS

CN       102105916 A       6/2011
CN       102576484 A       7/2012
(Continued)

OTHER PUBLICATIONS

Han Chen et al: "Logical RFID Reader Using Hybrid Active-Passive Solution", PRoceedings of the IEEE., New York, vol. 98, No. 9, Sep. 1, 2010, pp. 1636-1647.
(Continued)

*Primary Examiner* — Quan Zhen Wang
*Assistant Examiner* — Mancil Littlejohn, Jr.
(74) *Attorney, Agent, or Firm* — ArentFox Schiff LLP

(57) ABSTRACT

Example aspects include techniques for reducing false alarms caused by stray tags. These techniques may include determining, by a processor of an EAS system, a chatter score of a RFID identification of a RFID tag that generated one or more RFID readings at one or more RFID readers, and selecting, by the processor of the EAS system, the RFID identification based at least in part on the chatter score being below a chatter score threshold. In addition, the techniques may include determining, by the processor of the EAS system, that the RFID identification corresponds to a RFID
(Continued)

tag in motion, and triggering, by the processor of the EAS system, an alarm based on a determination that the RFID tag identified by the RFID identification is not authorized to leave a controlled area associated with the one or more RFID readers.

25 Claims, 13 Drawing Sheets

Related U.S. Application Data on Feb. 2, 2021, provisional application No. 63/143,388, filed on Jan. 29, 2021.

(56) References Cited

FOREIGN PATENT DOCUMENTS

| | | | | | |
|----|----------------|------|---|--------|------------------|
| CN | 103384889 A    |      |   | 11/2013 | |
| CN | 112041900 A    |      |   | 12/2020 | |
| CN | 113326707 A    | *    |   | 8/2021  | ........... G06K 7/0008 |
| WO | WO-2020146117 A1 | *  |   | 7/2020  | ......... G08B 13/2482 |

OTHER PUBLICATIONS

International Search Report and Written Opinion issued in International Patent Application No. PCT/US2022/070420 on Jun. 30, 2022.

\* cited by examiner

| batch_count | dt | epc | reader_dt | reader | antenna | rssi | freq | power |
|---|---|---|---|---|---|---|---|---|
| 0 | 2021-01-14 09:10:21 | 08285DF03283C4F60B93EB1940038400 | 2021-01-14 09:10:18.310000 | 2 | 8 | -6000 | 3736 | 3300 |
| 1 | 2021-01-14 09:10:21 | 08285D9F012B67715DE18588E8BC10400 | 2021-01-14 09:10:18.310000 | 2 | 8 | -7200 | 124 | 3300 |
| 2 | 2021-01-14 09:10:21 | 08285D33147074F53CBB61613422D0400 | 2021-01-14 09:10:18.311000 | 2 | 8 | -6650 | 920 | 3300 |
| 3 | 2021-01-14 09:10:21 | 08285DF03283C5F722E3E2640448400 | 2021-01-14 09:10:18.311000 | 2 | 8 | -6150 | 1672 | 3300 |
| 4 | 2021-01-14 09:10:21 | 08285DF03283C5CD359BCF6F7F028400 | 2021-01-14 09:10:18.311000 | 2 | 8 | -6300 | 1696 | 3300 |

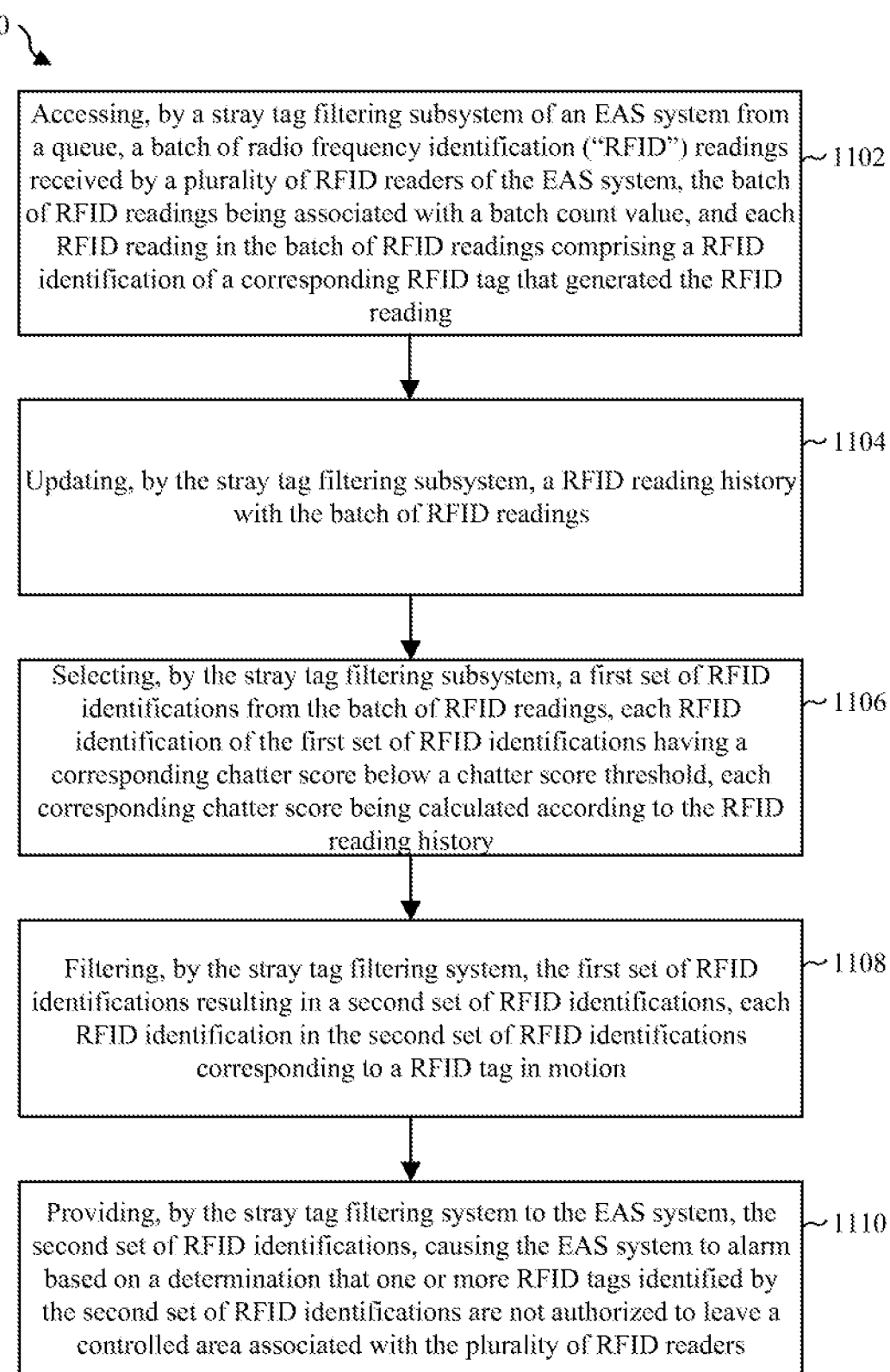

1100

Accessing, by a stray tag filtering subsystem of an EAS system from a queue, a batch of radio frequency identification ("RFID") readings received by a plurality of RFID readers of the EAS system, the batch of RFID readings being associated with a batch count value, and each RFID reading in the batch of RFID readings comprising a RFID identification of a corresponding RFID tag that generated the RFID reading — 1102

Updating, by the stray tag filtering subsystem, a RFID reading history with the batch of RFID readings — 1104

Selecting, by the stray tag filtering subsystem, a first set of RFID identifications from the batch of RFID readings, each RFID identification of the first set of RFID identifications having a corresponding chatter score below a chatter score threshold, each corresponding chatter score being calculated according to the RFID reading history — 1106

Filtering, by the stray tag filtering system, the first set of RFID identifications resulting in a second set of RFID identifications, each RFID identification in the second set of RFID identifications corresponding to a RFID tag in motion — 1108

Providing, by the stray tag filtering system to the EAS system, the second set of RFID identifications, causing the EAS system to alarm based on a determination that one or more RFID tags identified by the second set of RFID identifications are not authorized to leave a controlled area associated with the plurality of RFID readers — 1110

FIG. 11

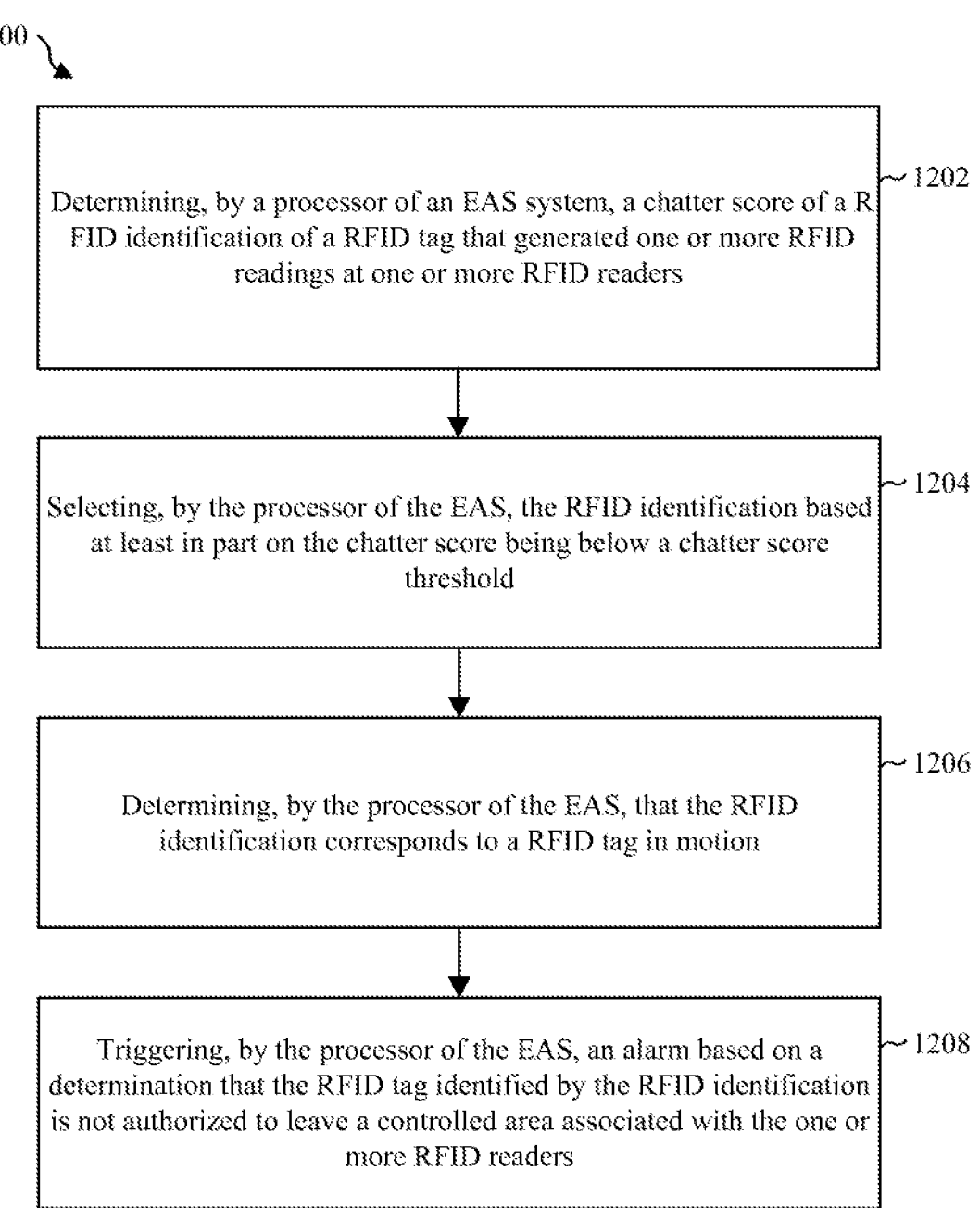

1200

Determining, by a processor of an EAS system, a chatter score of a RFID identification of a RFID tag that generated one or more RFID readings at one or more RFID readers ~ 1202

Selecting, by the processor of the EAS, the RFID identification based at least in part on the chatter score being below a chatter score threshold ~ 1204

Determining, by the processor of the EAS, that the RFID identification corresponds to a RFID tag in motion ~ 1206

Triggering, by the processor of the EAS, an alarm based on a determination that the RFID tag identified by the RFID identification is not authorized to leave a controlled area associated with the one or more RFID readers ~ 1208

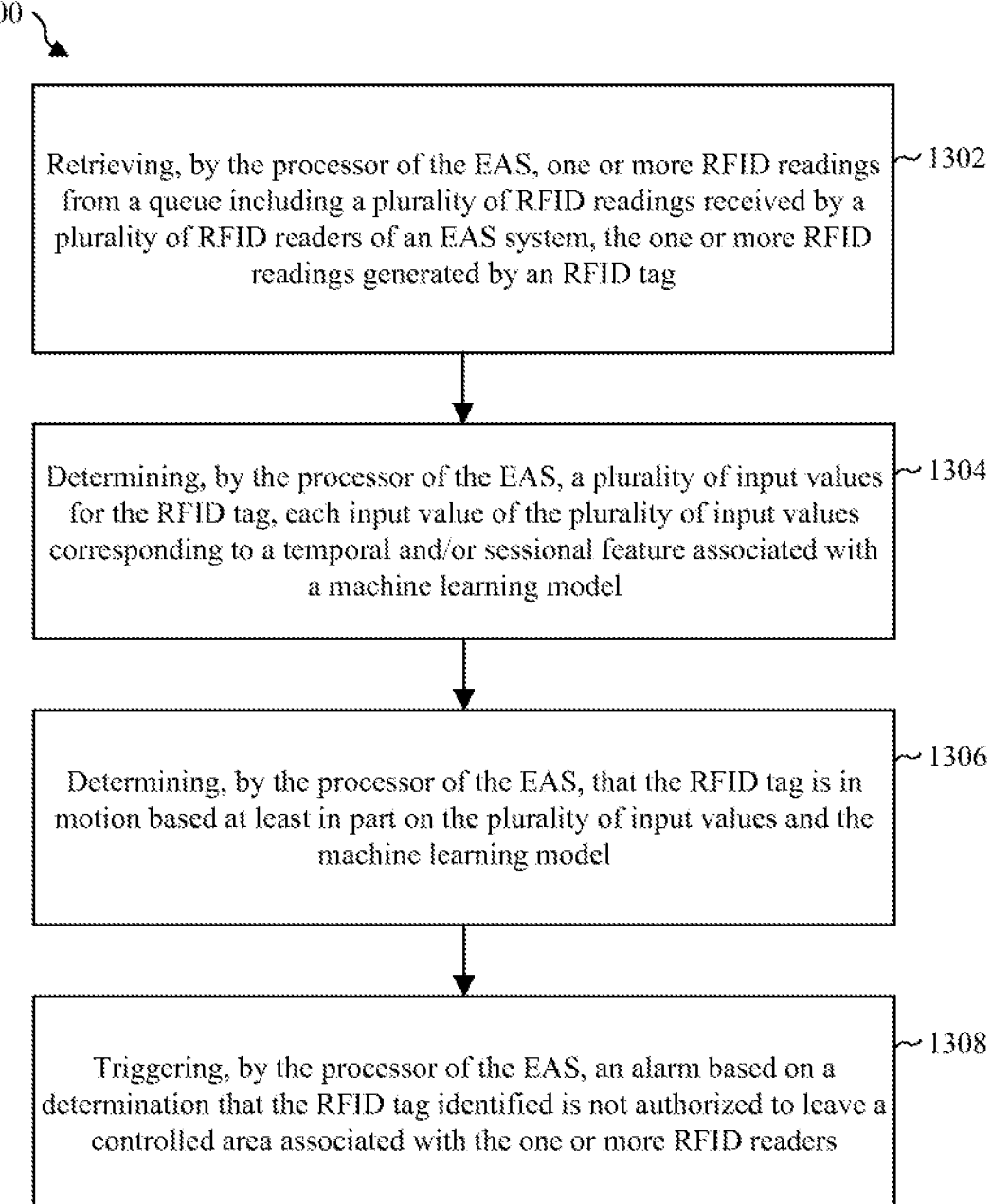

Retrieving, by the processor of the EAS, one or more RFID readings ~1302
from a queue including a plurality of RFID readings received by a
plurality of RFID readers of an EAS system, the one or more RFID
readings generated by an RFID tag Determining, by the processor of the EAS, a plurality of input values ~1304
for the RFID tag, each input value of the plurality of input values
corresponding to a temporal and/or sessional feature associated with
a machine learning model Determining, by the processor of the EAS, that the RFID tag is in ~1306
motion based at least in part on the plurality of input values and the
machine learning model Triggering, by the processor of the EAS, an alarm based on a ~1308
determination that the RFID tag identified is not authorized to leave a
controlled area associated with the one or more RFID readers

FIG. 13

RADIO FREQUENCY IDENTIFICATION (RFID) TAG STRAY ALARM MITIGATION

CROSS-REFERENCE TO RELATED APPLICATION

This application is a 35 U.S.C. § 371 National Stage Application of International Patent Application No. PCT/US2022/070420, entitled "RADIO FREQUENCY IDENTI-FICATION RFID) TAG STRAY ALARM MITIGATION," filed Jan. 28, 2022, which claims priority to U.S. Patent Application No. 63/143,388, entitled "RADIO-FRE-QUENCY IDENTIFICATION (RFID) TAG STRAY ALARM MITIGATION," filed on Jan. 29, 2021, U.S. Patent Application No. 63/144,777, entitled "MACHINE LEARN-ING MODEL FOR RADIO FREQUENCY IDENTIFICA-TION (RFID) TAG STRAY ALARM MITIGATION," filed on Feb. 2, 2021, and U.S. Patent Application No. 63/144,822, entitled "AUTOMATIC CALIBRATION OF RADIO FREQUENCY IDENTIFICATION (RFID) TAG STRAY ALARM MITIGATION FRAMEWORK," filed on Feb. 2, 2021, the disclosures of which are incorporated by reference herein in their entireties.

BACKGROUND

Technical Field

The present disclosure relates generally to Electronic Article Surveillance ("EAS"), and more particularly, to examples related to mitigating stray tags in an EAS system using a Radio Frequency Identification ("RFID") tag.

Introduction

EAS systems are used to control inventory and to prevent or deter theft or unauthorized removal of articles from a controlled area. Such systems establish an electromagnetic field or "interrogation zone" that defines a surveillance zone (for example, entrances and/or exits in retail stores) encom-passing the controlled area. The articles to be protected are tagged with an EAS security tag. Tags are designed to interact with the field in the interrogation zone, e.g., estab-lished by an EAS portal. The EAS portal includes one or more EAS readers (e.g., transmitter/receiver, antennas), and an EAS detection module/controller. The presence of a tag in the interrogation zone is detected by the system and appropriate action is taken. In most cases, the appropriate action includes the activation of an alarm.

In the retail industry, it is common to "source tag" articles with RFID tags, either at the time of packaging/manufacture, or at some other point in the supply chain. At the same time, EAS technology and devices have proven critical to the reduction of theft and so called "shrinkage." Since many articles arrive at the retailer with RFID tags, it is desirable that RFID tags be used also to provide EAS functionality in addition to their intended function of providing capabilities such as inventory control, shelf reading, non-line of sight reading, etc.

In some implementations, a RFID tag can be used to simulate EAS functionality by sending special codes when a reader interrogates the RFID tag. This arrangement advan-tageously eliminates the need for a separate EAS compo-nent, such as an acousto-magnetic ("AM") component, within the tag, or a separate EAS tag. Various schemes can be used to enable the use of RFID tags to simulate EAS functionality. In some such systems, the RFID tag indicates in some way that the item to which the tag is attached has been purchased at point of sale ("POS"). If the RFID tag is a detachable tag, the RFID tag can be simply detached at the point of sale. In such a system, the RFID readers at the exit would trigger an alarm if any tags are detected. In other systems, the RFID tag may remain on the item, and an alarm is triggered if the RFID tag does not indicate that the item was purchased. For example, in such a system, data is written to the RFID chip at the POS to confirm the item was purchased. One common method is encoding a bit-flip at the POS, with the changed bit indicating that the item is authorized for removal. Other systems may read a unique ID from the tag, and store the unique ID in the enterprise system when the tagged item is purchased, so that the purchase can be verified by RFID readers as the tag exits the premises. Thus, if the purchase of the item cannot be verified based on tag data when the tag passes out of the store, an alarm can be triggered.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Examples of the technology disclosed herein include methods, systems, and apparatuses of EAS. An example aspect includes a method of EAS, comprising accessing, by a processor of an EAS system from a queue, a batch of RFID readings received by a plurality of RFID readers of the EAS system. The batch of RFID readings being associated with a batch count value. Each RFID reading in the batch of RFID readings comprising a RFID identification of a correspond-ing RFID tag that generated the RFID reading. The method further includes updating, by the processor, a RFID reading history with the batch of RFID readings. The method further includes automatically calibrating, by the processor, a chat-ter score threshold. The method further includes selecting, by the processor, a first set of RFID identifications from the batch of RFID readings. Each RFID identification of the first set of RFID identifications having a corresponding chatter score below the chatter score threshold. Each corresponding chatter score being calculated according to the RFID reading history. The method further includes filtering, by the pro-cessor, the first set of RFID identifications resulting in a second set of RFID identifications. Each RFID identification in the second set of RFID identifications corresponding to a RFID tag in motion. The method further includes providing, by the processor to the EAS system, the second set of RFID identifications, causing the EAS system to alarm based on a determination that one or more RFID tags identified by the second set of RFID identifications are not authorized to leave a controlled area associated with the plurality of RFID readers.

Another example aspect includes a method of EAS, comprising accessing, by a processor of an EAS system from a queue, a batch of RFID readings received by a plurality of RFID readers of the EAS system. The batch of RFID readings may have been received during a particular time period. Each RFID reading in the batch of RFID readings may comprise a RFID identification of a corre-sponding RFID tag that generated the RFID reading. The batch of RFID readings may comprise a minimum quantity of RFID readings for each corresponding RFID tag. The method further includes determining a set of RFID identifications from the batch of RFID readings according to at least one machine learning algorithm. Each RFID identification in the set of RFID identifications may correspond to a RFID tag in motion. The method further includes providing, by the processor to the EAS system, the set of RFID identifications, causing the EAS system to alarm based on a determination that one or more RFID tags identified by the set of RFID identifications are not authorized to leave a controlled area associated with the plurality of RFID readers.

Another example aspect includes a method comprising accessing, by a processor of an EAS system from a queue, a batch of RFID readings received by a plurality of RFID readers of the EAS system. The batch of RFID readings may have been received during a particular time period. Each RFID reading in the batch of RFID readings may comprise a RFID identification of a corresponding RFID tag that generated the RFID reading. The batch of RFID readings may comprise a minimum quantity of RFID readings for each corresponding RFID tag. The method further includes determining a set of RFID identifications from the batch of RFID readings according to at least one machine learning algorithm. Each RFID identification in the set of RFID identifications may correspond to a RFID tag in motion. The method further includes providing, by the processor to the EAS system, the set of RFID identifications, causing the EAS system to alarm based on a determination that one or more RFID tags identified by the set of RFID identifications are not authorized to leave a controlled area associated with the plurality of RFID readers.

Another example aspect includes a method of EAS, comprising determining, by a processor of an EAS system, a chatter score of a RFID identification of a RFID tag that generated one or more RFID readings at one or more RFID readers; selecting, by the processor of the EAS system, the RFID identification based at least in part on the chatter score being below a chatter score threshold; determining, by the processor of the EAS system, that the RFID identification corresponds to a RFID tag in motion; and triggering, by the processor of the EAS system, an alarm based on a determination that the RFID tag identified by the RFID identification is not authorized to leave a controlled area associated with the one or more RFID readers.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 3 is a diagram illustrating an example of a batch of RFID readings, in accordance with various aspects of the present disclosure.

FIG. 11 is a flowchart of a first method of EAS to be performed by a computing device, in accordance with various aspects of the present disclosure.

FIG. 12 is a flowchart of a second method of EAS to be performed by a computing device, in accordance with various aspects of the present disclosure.

FIG. 13 is a flowchart of a third method of EAS to be performed by a computing device, in accordance with various aspects of the present disclosure.

DETAILED DESCRIPTION

Figure 1A:
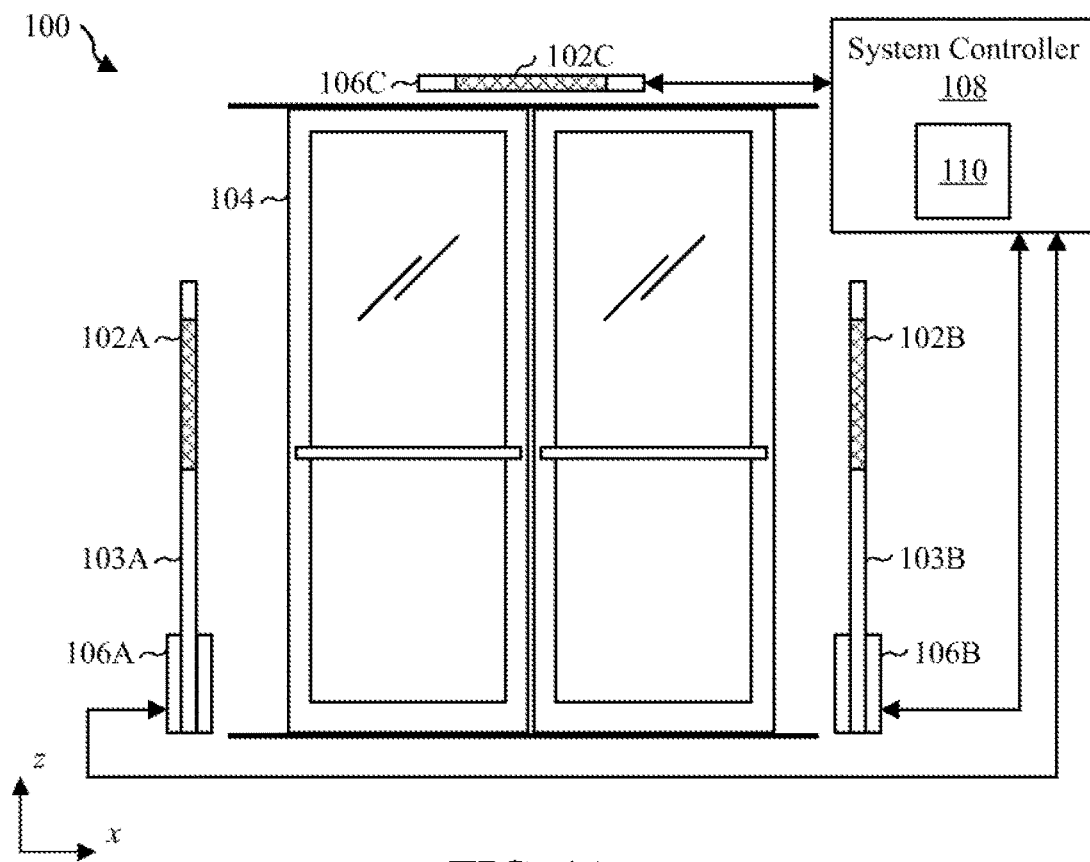
FIG. 1A is a plan view of an illustrative EAS portal, in accordance with various aspects of the present disclosure.

It will be readily understood that the components of the aspects as generally described herein and illustrated in the appended figures could be arranged and designed in a wide variety of different configurations. Thus, the following more detailed description of various aspects, as represented in the figures, is not intended to limit the scope of the present disclosure, but is merely representative of various aspects. While the various aspects of the aspects are presented in drawings, the drawings are not necessarily drawn to scale unless specifically indicated.

The present solution may be embodied in other specific forms without departing from its spirit or essential characteristics. The described aspects are to be considered in all respects only as illustrative and not restrictive. The scope of the present solution is indicated by the appended claims rather than by this detailed description. All changes that come within the meaning and range of equivalency of the claims are to be embraced within their scope.

Reference throughout this specification to features, advantages, or similar language does not imply that all of the features and advantages that may be realized with the present solution should be or are in any single aspect of the present solution. Rather, language referring to the features and advantages is understood to mean that a specific feature, advantage, or characteristic described in connection with an aspect is included in at least one aspect of the present solution. Thus, discussions of the features and advantages, and similar language, throughout the specification may, but do not necessarily, refer to the same aspect.

Furthermore, the described features, advantages, and characteristics of the present solution may be combined in any suitable manner in one or more aspects. One skilled in the relevant art will recognize, in light of the description herein, that the present solution can be practiced without one or more of the specific features or advantages of a particular aspect. In other instances, additional features and advantages may be recognized in certain aspects that may not be present in all aspects of the present solution.

Reference throughout this specification to "one aspect," "an aspect," or similar language means that a particular feature, structure, or characteristic described in connection with the indicated aspect is included in at least one aspect of the present solution. Thus, the phrases "in one aspect", "in an aspect," and similar language throughout this specification may, but do not necessarily, all refer to the same aspect.

As used in this document, the singular form "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

Conventional EAS systems may comprise RFID readers and RFID tags. The RFID readers may act both as transmitters and as receivers. The RFID tags may respond to RFID signals transmitted by the RFID readers and the RFID readers may receive the responses from the RFID tags. The strength of the return signal received by the RFID reader from the RFID tags may be referred to as a received signal strength indicator ("RSSI"). A power level of the RFID signals transmitted by the RFID readers may directly impact the RSSI values. A difference between an angle at which the RFID signal is transmitted and an angle at which a corresponding RFID response is received may be referred to as a phase angle. A conventional EAS system may determine whether a particular RFID tag is moving or static (e.g., stationary) based on RSSI and phase values corresponding the particular RFID tag. For example, conventional EAS systems may comprise rule-based techniques based on at least RSSI and/or phase values to determine whether the particular RFID tag is moving. Alternatively or additionally, the conventional EAS system may activate an alarm based on a determination that the particular RFID tag is exiting a premise (e.g., a retail store). However, such conventional EAS systems may have a relatively high false positive rate. A false positive may generally be addressed as an event in which the conventional EAS system activates an alarm based on an erroneous determination that a particular RFID tag is exiting the premise.

In conventional EAS systems, the use of RFID tags as an EAS exit solution may be limited by stray or reflected radio frequency ("RF") signals that may cause false alarms. That is, stationary (e.g., non-moving) RFID tags may produce similar sets of RFID readings as a moving RFID tag due to radio interference and/or other factors such as metallic reflections and human body movements. For example, false alarms may be caused by stationary RFID tags located some distance from the EAS portal (e.g., entrance and/or exit in a retail store facility). In another example, changing RF reflections due to moving fixtures (e.g., revolving doors, escalators, mirrors) and/or human motion (e.g., customers pushing shopping carts, employees moving metallic racks) may cause stationary RFID tags to appear to be moving. These tags may generally be addressed as stray tags. As such, the number of false alarms caused by stray tags may compromise the accuracy and effectiveness of a conventional EAS system.

However, stray tag mitigation may be a challenge in a retail store scenario. A retail store facility may be a dynamic RF environment with various metallic reflections caused by moving doors, mirrors, moving metallic racks, customer foot traffic, among others. That is, a conventional EAS system may be challenged to differentiate a tag that is moving through the pedestals installed near the store exit from non-moving/stray tags.

Examples of the technology disclosed herein provide for multiple manners to mitigate false alarms caused by stray tags. In certain aspects, the EAS system may comprise a stray tag component configured to filter out RFID readings associated with stray tags. Further, aspects presented herein may increase accuracy and effectiveness over conventional EAS systems.

These and other features of the present disclosure are discussed in detail below with regard to FIGS. 1-11.

Figure 1B:
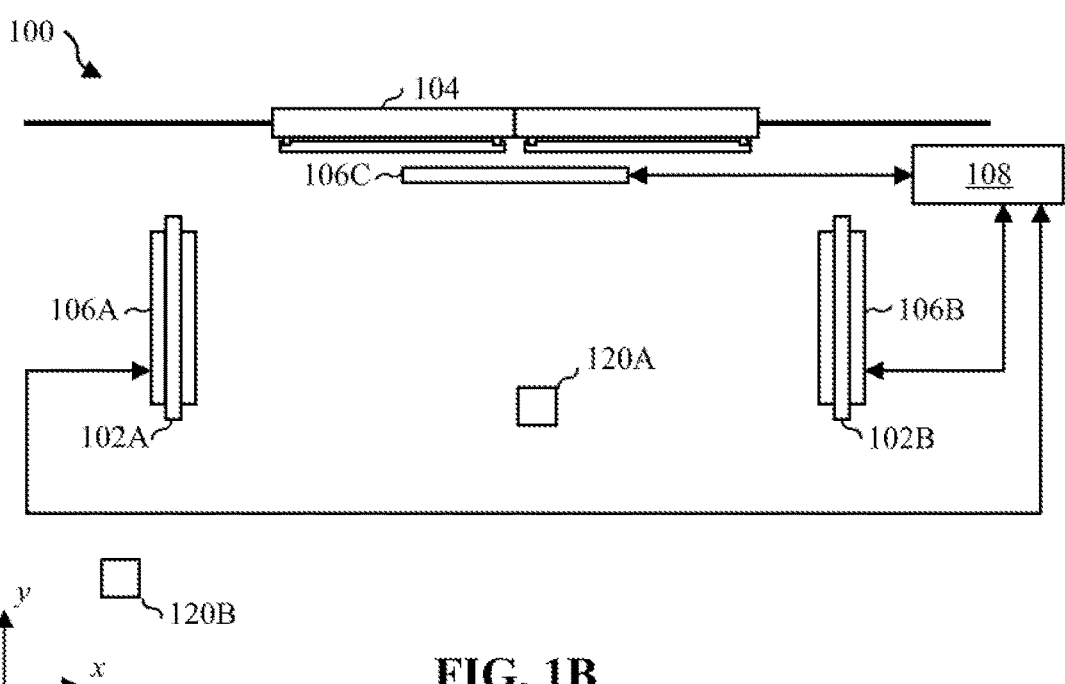
FIG. 1B is a top view of an illustrative EAS portal, in accordance with various aspects of the present disclosure.

Referring now to FIGS. 1A-1B, there is provided a schematic illustration (plan view in FIG. 1A and top view in FIG. 1B) of an illustrative EAS portal 100 that is useful for understanding the present solution. The present solution is described herein in relation to a retail store environment. The present solution is not limited in this regard, and can be used in other environments. For example, the present solution can be used in distribution centers, factories and other commercial environments. Notably, the present solution can be employed in any environment in which objects and/or items/articles need to be located and/or tracked.

The EAS portal 100 may include RFID readers 106A, 106B, 106C (hereinafter "106", generally) configured to read RFID tags. Each RFID reader 106 may be respectively attached to antennas 102A, 102B, 102C (hereinafter "102", generally) mounted on the sides of the EAS portal 100. The RFID reader 506 as referenced herein may be capable of generating RFID tag exciter signals to control and elicit responses from one or more of a plurality of RFID tags (such as tags 120A-120B, hereinafter "120" generally) in a EAS portal zone. The RFID exciter signals may also serve as a source of power for energizing the RFID tags 120. The exciter signals generated by the RFID readers 106 and responses received by each RFID reader 106 may be in accordance with a RFID system standard that is now known or known in the future. Alternatively or additionally, the RFID readers 106 may detect, identify, and/or process one or more the responses from the plurality of RFID tags 120 in the EAS portal zone. The RFID readers 106 may include suitable interface circuitry to facilitate communications with a system controller 108 (e.g., a server) as described below. For example, the interface circuitry may facilitate communication of information regarding detected responses received from RFID tags 120. Such interface circuitry can also facilitate reception of interrogation commands and/or antenna beam control commands from the system controller 108.

The RFID tags 120 may each comprise identification information, such as a serial number, an electronic product code ("EPC"), and a stock keeping unit ("SKU") number, that uniquely identifies each RFID tag 120. As such, the RFID tags 120 may respond to the RFID readers 106 by providing the respective identification information.

In the EAS portal 100 shown, the antennas 102 may mounted on pedestals 103A, 103B (hereinafter "103," generally) and in the ceiling (e.g., 102C), but the technology disclosed herein is not limited in this regard. For example, antennas 102 may be mounted in the ground, and the method described herein would still be applicable. There is no restriction regarding the type of antennas 102 that are used to produce the required field patterns. For example, antennas 102 may be beam steerable so that multiple different antenna beam directions may be obtained from a single antenna 102. Alternatively or additionally, the RFID reader 106 may comprise multiple antennas 102. Control over the required antenna field patterns may be facilitated by the RFID readers 106 as noted above. In addition, three antennas, 102A, 102B, and 102C, are shown in FIGS. 1A-1B, but it should be understood that the technology disclosed herein is not limited in this regard. For example, the inventive arrangements described herein may be implemented using a single beam steerable antenna. In another example, the inventive arrangements described herein may be implemented using additional antennas.

The EAS portal 100 may be placed in the vicinity of an entrance and/or exit point in a premise (e.g., retail store facility) where articles must pass through in order to transition from one space inside the premise to a second space, which is outside of the premise. In the example shown in FIGS. 1A-1B, the EAS portal is located in the vicinity of a doorway 104, but the technology disclosed herein is not limited in this regard. The entrance/exit/choke point may also be a wide exit such as those seen in shopping malls, which is open to another interior space, which is not part of the premise.

The RFID readers 106 may be operated under the command of a system controller 108, such as server, for example, which facilitates the detection of the one or more RFID tags 120 within a field of view of each antenna 102 as hereinafter described. The system controller 108 may be situated local to the premise, as shown in FIGS. 1A-1B, or may be located in a remote location. The system controller 108 may be configured to write data to and/or read data from RFID readers 106 and/or RFID tags 120.

In certain aspects, the system controller 108 may include a stray tag component 110 configured to access a batch of RFID readings from queue that have been received from RFID readers 106, update a RFID reading history, select a first set of RFID identifications from the batch of RFID readings, filter the first set of RFID identifications resulting in a second set of RFID identifications, and provide the second set of RFID identifications to the EAS system. The stray tag component 110 may be configured to perform a two-stage cascading filtering algorithm to mitigate false alarms that may potentially be caused by stray tags. A first stage of the filtering algorithm may eliminate noise from the RFID readings in the form of chatter, thereby reducing the number of RFID identifications in the second decision process. A second stage of the filtering algorithm analyzes the RFID identifications that emerged from the first stage and determines whether the RFID identifications indicate a stray tag or a moving tag. As such, the second stage further mitigates false alarms potentially caused by the stray tags. Thereby, increasing accuracy and effectiveness over conventional EAS systems.

Figure 2:
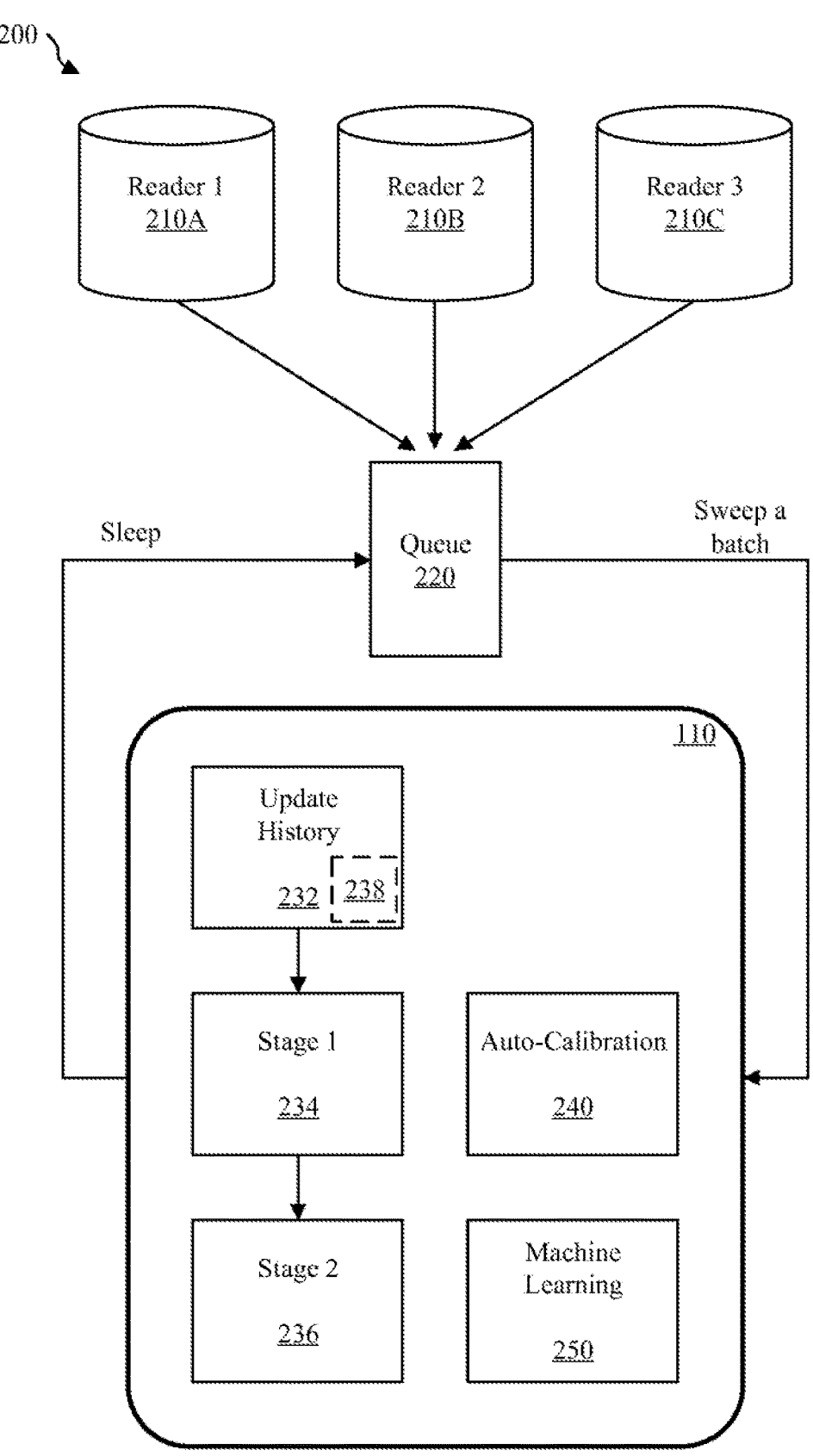
FIG. 2 is a diagram illustrating an example architecture for a EAS system, in accordance with various aspects of the present disclosure.

FIG. 2 is a schematic illustration of an example architecture 200 for an EAS system. Reader processes 210A, 210B, and 210C (hereinafter "210", generally) may extract RFID responses from RFID readers 106 and/or RFID tags 120, for example. The reader processes 210 may populate a queue 220 with the extracted RFID responses. The reader processes 210 may be configured to periodically populate the queue 220 according to a read rate. For example, the reader processes 210 may be configured to populate the queue 220 once every 3 seconds. In some aspects, the read rate may be configured according to power settings of the RFID readers 106. Alternatively or additionally, the reader processes 210 may be configured with a single read rate or each reader processes 210 may be configured with a distinct read rate.

The stray tag component 110 may be configured to sweep a batch of RFID readings from the queue 220 at a set interval. That is, a sleep time parameter may determine a time duration that the stray tag component 110 may wait before sweeping a next batch of RFID readings from the queue 220. The sleep time parameter, or MIN-STEP-TIME, may be configurable. In some aspects, the MIN-STEP-TIME interval may be configured according to the read rate of the reader processes 210. For example, the MIN-STEP-TIME interval may be adjusted to match the read rate.

In some aspects, the stray tag component 110 may be configured to extract all RFID readings from the queue 220 during each sweep. That is, after the sleep time interval has expired, the stray tag component 110 may sweep all data content from the queue 220 for further processing.

In other aspects, the stray tag component 110 may be configured to process a portion of the previous queue contents with the current batch RFID readings. That is, the stray tag component 110 may combine a portion of the RFID readings from the previous batch with the RFID readings from the current batch for processing during the current sweep cycle. Such a configuration may be advantageous if or when the read rate is split between sleep time intervals. Alternatively or additionally, the portion of the RFID readings from the previous batch may aid in the processing of the RFID readings from the current batch. A size of the portion of the RFID readings from the previous batch may be configurable. For example, the portion size may be configured to be a percentage (e.g., 20%) of the quantity of RFID readings in the previous batch.

In yet other aspects, the stray tag component 110 may be configured to extract and process the RFID readings from the queue 220 if or when a quantity of RFID readings in the queue 220 reaches or exceeds a threshold. For example, the stray tag component 110 may be configured to extract and process N or more RFID readings from the queue 220, wherein N is a positive integer greater than zero.

FIG. 3 is a diagram illustrating an example of a batch of RFID readings. As shown in FIG. 3, a batch may be assigned a value, batch_count. The batch_count value may serially increment. For example, a first batch may be assigned a batch_count value of 1 and a second (and subsequent) batch may be assigned a batch_count value of 2. In some aspects, a RFID reading in a batch may comprise a first timestamp, dt, indicating a first time instance at which the RFID reading was extracted from the queue 220. In other aspects, a RFID reading may comprise identification information corresponding to the RFID tag 120 that generated the response. For example, a RFID reading may comprise an electronic product code ("EPC") value, epc, as shown in FIG. 3, identifying the RFID tag 120 that generated the response. In other aspects, a RFID reading may comprise a second timestamp, reader_dt, indicating a second time instance at which the response was received by the RFID reader 106. In other aspects, a RFID reading may comprise reader identification, reader, identifying the reader (e.g., 106A, 106B, 106C) that received the RFID reading. In other aspects, a RFID reading may comprise antenna identification, antenna, identifying the antenna (e.g., 102A, 102B, 102C) that received the RFID reading. In other aspects, a RFID reading may comprise signal measurements of the RFID response. For example, as shown in FIG. 3, a RFID reading may comprise a received signal strength indicator (e.g., rssi), a frequency (e.g., freq), and a power level indication (e.g., power) of the RFID reading.

Referring back to FIG. 2, the stray tag component 110 may comprise an update history component 232, a Stage 1 component 234, and a Stage 2 component 236. In some aspects, the stray tag component 110 may comprise an auto-calibration component 240 configured to automatically adjust certain parameters utilized by the stray tag component 110 (e.g., the Stage 1 component 234, the Stage 2 component 236). Alternatively or additionally, the stray tag component 110 may comprise a machine learning component 250 configured to use machine learning techniques for improving the accuracy of the stray tag component 110. For example, the machine learning component 250 may be used as a third pass in addition to the first pass and second pass performed by the Stage 1 component 234 and the Stage 2 component 236, respectively. In particular, the RFID tags declared as moving tags by the Stage 2 component 236 and the machine learning component 250 may be used to trigger an alarm based on unauthorized movement.

The update history component 232 may be configured to process the RFID readings extracted by the stray tag component 110 by performing the following operations.

For each batch of RFID readings, if or when a quantity of RFID readings from a particular EPC is less than an EPC-COUNT-FILTER parameter, the RFID readings from the particular EPC will not be further processed. That is, EPCs passing this criteria are processed further.

At this stage, a history is built for each EPC.

If or when the EPC is not in the history already, a new entry is created for this EPC.

a. Once a new entry is created, the following values are stored under it:

i. first_observed_batch;

ii. last_observed_batch; and iii. consequent_batches_observed.

b. The first_observed_batch indicates the batch_count at which this EPC was added to the history. That is, the first_observed_batch indicates the batch_count at which this EPC was first observed. For new entries, the first_observed_batch may be set to the current batch_count.

c. The last_observed_batch indicates the batch_count at which this EPC was last observed. The last_observed_batch is set to the current batch_count. For new entries, the last_observed_batch may match the first_observed_batch.

d. The consequent_batches_observed indicates a count of batches in which this EPC has been observed. For new entries, the consequent_batches_observed may be set to zero, indicating that the current batch_count is the first batch_count at which this EPC has been observed.

If or when the EPC is present already in the history, the history values for this EPC may be updated as follows.

a. If or when (current batch_count-last_observed_batch) is less than a CONSQ_BATCHES_THRESHOLD, the last_observed_batch is set to the current batch_count and the consequent_batches_observed is incremented by one.

b. Else, the first_observed_batch is set to zero, the last_observed_batch is set to the current batch_count, and the consequent_batches_observed is set to zero. That is, this condition may be reached when a RFID tag 120 has not been observed by a RFID reader 106 for considerable amount of time, as determined by the CONSQ_BATCHES_THRESHOLD. As such, the history for this EPC is reset back to its initial values.

After the update history component 232 has processed the batch of RFID readings, the RFID readings that are passed to the Stage 1 component 234. The Stage 1 component 234 may be configured to calculate a chatter score for each EPC in the batch of RFID readings. First EPCs with respective chatter scores that exceed a chatter score threshold may be considered stray tags, and are omitted from further processing. That is, the first EPCs may be associated with stationary RFID tags that appear to be moving due to radio interference and the like. Second EPCs with respective chatter scores that do not exceed the chatter score threshold may be processed further. That is, the second EPCs may be selected as candidates for moving (e.g., outgoing) tags.

For each EPC in the batch of RFID readings, the Stage 1 component 234 may calculate a time duration during which the corresponding EPC has been observed, as follows:

$$duration = (batch\_count - first\_observed\_batch) + 1$$

The Stage 1 component 234 may calculate a chatter score as follows:

$$chatter\_score = \log_2(duration + e^{-7})$$

Figure 4:
FIG. 4 is a diagram illustrating example chatter score values for a first electronic product code ("EPC"), in accordance with various aspects of the present disclosure.
Figure 4:
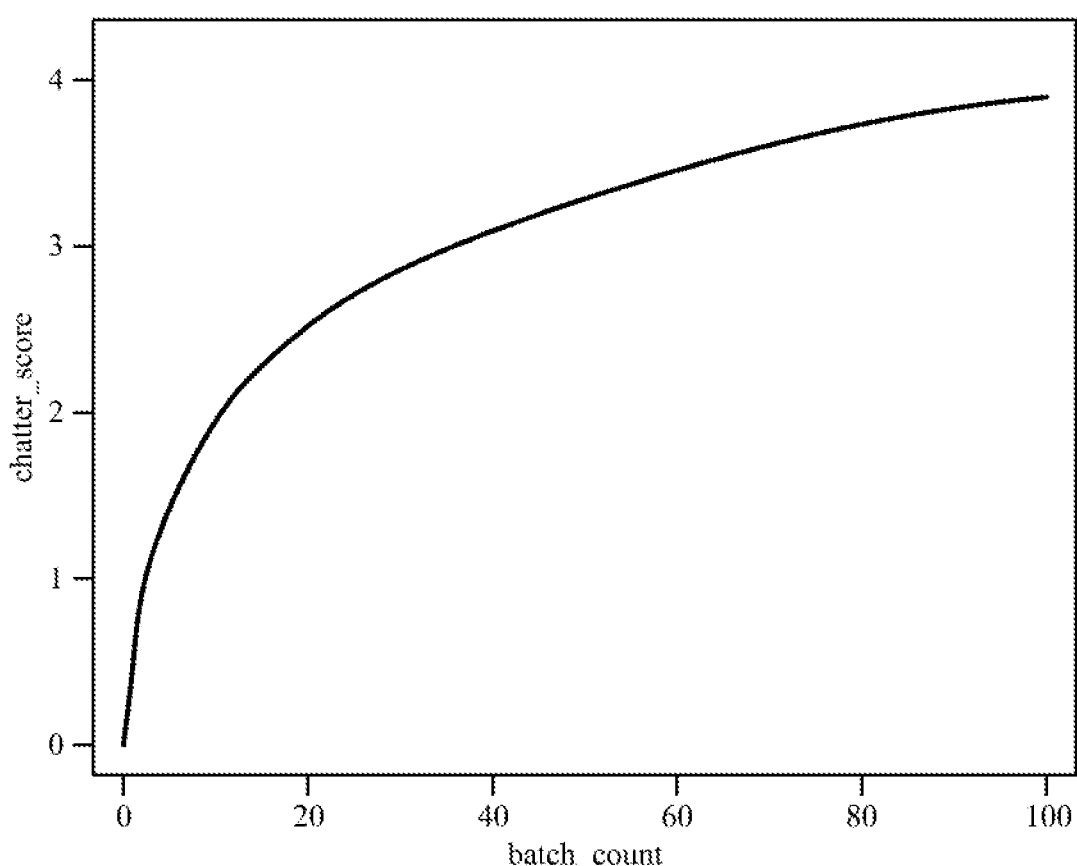

An EPC which is repeatedly observed across subsequent batches may exhibit a behavior similar to the chatter_score values shown in FIG. 4. That is, the chatter_score values (e.g., y-axis) for such an EPC may monotonically increase when plotted as a function of the batch_count (e.g., x-axis). Such a chatter score behavior may generally be addressed as continuous chatter. As such, an EPC exhibiting continuous chatter may be considered to indicate a stray tag (e.g., stationary).

Referring to FIG. 2, the Stage 1 component 234 may be configured to comprise one or more chatter score thresholds. The one or more chatter score thresholds may be determined based at least on a read rate of the reader processes 210. Each chatter score threshold of the one or more chatter score thresholds may define a band of chatter score values that indicate a moving tag. The Stage 1 component 234 may be configured to operate in a selected band from one of the configured bands. For example, the Stage 1 component 234 may be configured to comprise a Band 1 corresponding to a chatter score threshold of 0.75, a Band 2 corresponding to a chatter score threshold of 1.1, and a Band 3 corresponding to a chatter score threshold of 1.5. That is, if or when the Stage 1 component 234 is configured to run in Band 1, EPCs with a chatter score less than 0.75 may be evaluated as a moving tag and allowed to be processed further. Alternatively or additionally, EPCs with a chatter score that meet or exceed 0.75 may be evaluated as a stray tag and prevented from being processed further.

The EPCs which have passed the Stage 1 component 234 selection (e.g., moving tag candidates) may be forwarded to the Stage 2 component 236. The Stage 2 component 236 may be configured to calculate, for each EPC, the following features that are configured to further differentiate moving tags that should be evaluated for triggering an alarm, from stray tags that can be ignored, thereby reducing false alarms.

The Stage 2 component 236 may calculate a read rate, read_rate, corresponding to a quantity of RFID readings in the current batch that correspond to each EPC. The Stage 2 component 236 may calculate an antenna entropy measuring if the EPC has been read by a single antenna 102 or if the EPC is oscillating between multiple antennas 102, as follows:

$$\text{antenna\_entropy} = -\sum_{i=1}^{n} p_i \log p_i$$

where n is the number of antennas having readings from the EPC and $p_i$ is the probability that the EPC was read by a particular antenna. For example, if or when an EPC has 3 readings from antenna 8, [8, 8, 8], then the probability $p_1$ that the EPC was read by antenna 8 is 1.0, and the antenna_entropy is 0.0. For another example, if or when an EPC has two readings from antenna 8 and one reading from antenna 9, then the probability that $p_1$ that the EPC was read by antenna 8 is 0.66, the probability that $p_2$ that the EPC was read by antenna 9 is 0.33, and the antenna_entropy is 0.39.

The Stage 2 component 236 may calculate a reader entropy measuring if the EPC has been read by a single reader 106 or if the EPC has been read by multiple readers, as follows:

$$\text{reader\_entropy} = -\sum_{i=1}^{n} p_i \log p_i$$

where n is the number of readers having readings from the EPC and $p_i$ is the probability that the EPC was read by a particular reader. For example, if or when an EPC has 3 readings from reader 1, [1, 1, 1], then the probability $p_1$ that the EPC was read by reader 1 is 1.0, and the reader_entropy is 0.0. For another example, if or when an EPC has two readings from reader 1 and one reading from reader 2, then the probability that $p_1$ that the EPC was read by reader 1 is 0.66, the probability that $p_2$ that the EPC was read by reader 2 is 0.33, and the reader-_entropy is 0.39.

The Stage 2 component 236 may calculate a read burst, read_burst, measuring a sum of time elapsed between the first reading and the last reading across all readings for a particular EPC in the batch.

The Stage 2 component 236 may determine according to at least these calculated features whether each EPC in the batch is a stray (e.g., stationary) tag or a moving (e.g., outgoing) tag. In some aspects, the determination by the Stage 2 component 236 may comprise a decision tree. For example,

```
If (read_rate > 3 and read_rate < 30)
    If (antenna_entropy > 0.70 and reader_entropy > 0)
        If (antenna_entropy / reader_entropy > 1.0)
            If (read_burst < 2 seconds) then
                Declare EPC as a moving tag
```

Alternatively or additionally, the decision tree may be learned for each installation of the EAS system. In other aspects, a standard decision tree may be used across multiple installations.

The stray tag component 110 may provide, to the system controller 108, the EPCs that have been declared as moving tags by the Stage 2 component 236. In response, the system controller 108 may trigger an alarm based at least one a determination that one or more of the EPCs is not authorized to leave the EAS portal zone (e.g., either based on the tag being detected, or based on data on the tag not indicating that the item is purchased).

A chatter score of an EPC may exhibit a different behavior than the continuous chatter described above with reference to FIG. 4. For example, an EPC may be observed for some time and then the EPC may disappear. The EPC then may reappear at a later time in a cyclic or random fashion. Such a behavior may generally be addressed as a fleeting behavior. The update history component 232 may treat an EPC exhibiting the fleeting behavior as a new EPC if or when the EPC reappears. That is, the consequent batches threshold check (e.g., CONSQ_BATCHES_THRESHOLD) may cause the update history component 232 to remove the EPC from the history and to re-add the EPC whenever the EPC reappears.

Figure 5:
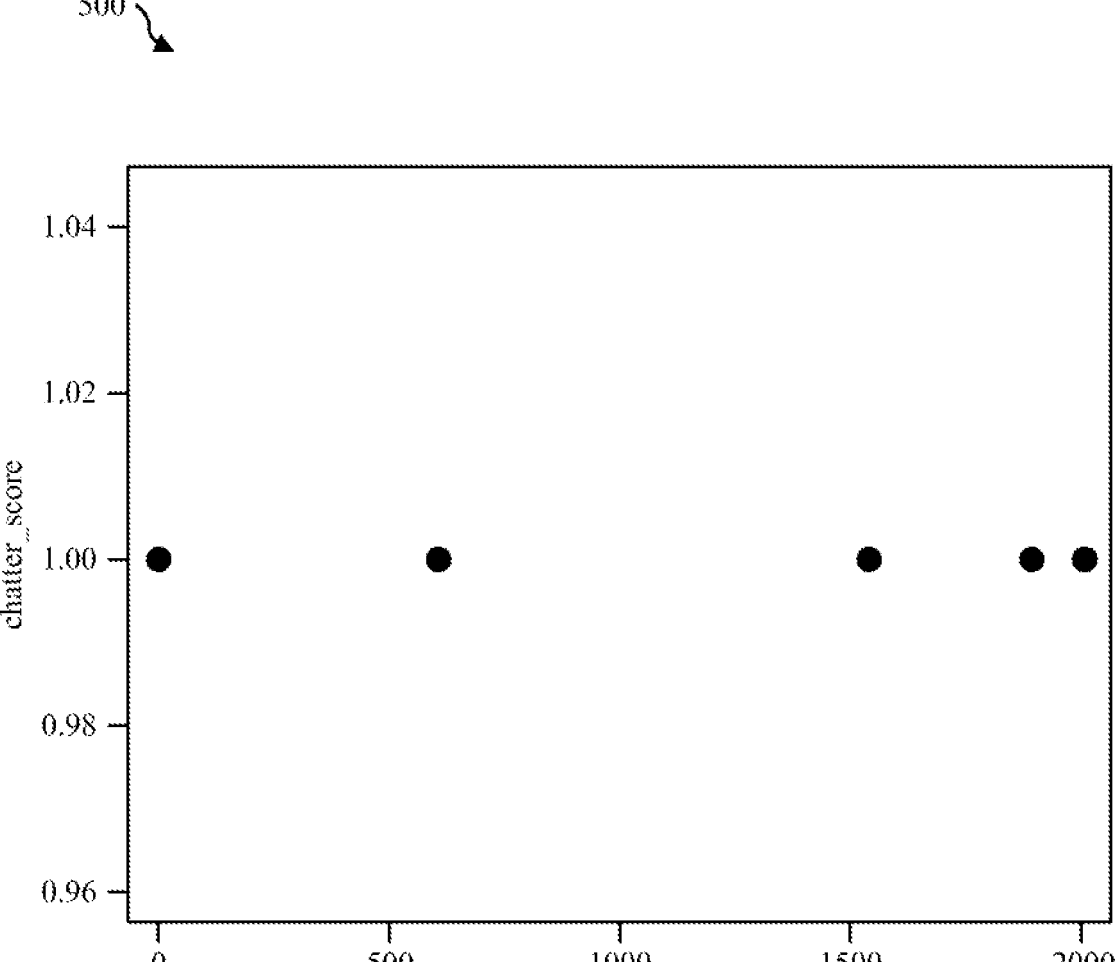
FIG. 5 is a diagram illustrating example chatter scores for a second EPC, in accordance with various aspects of the present disclosure.

For example, FIG. 5 shows chatter_score values for an EPC exhibiting the fleeting behavior. In the example shown in FIG. 5, the fleeting behavior EPC first appeared around the first batch and disappeared, reappeared around the $500^{th}$ batch and disappeared, reappeared around batches 1500, 1800, and 2000.

However, it would be advantageous to treat EPCs exhibiting the fleeting behavior in a manner similar to the continuously chattering EPCs, that is, to declare fleeting behavior EPCs as stray tags. Referring to FIG. 2, the update history component 232 may comprise a reset score component 238 configured to track a quantity of times that an EPC history has been reset by the update history component 232. That is, the reset score component 238 may increment by one a reset_count value if or when the update history component 232 resets the history for an EPC back to its initial values.

Figure 6:
FIG. 6 is a diagram illustrating example reset count values for the second EPC, in accordance with various aspects of the present disclosure.
Figure 6:
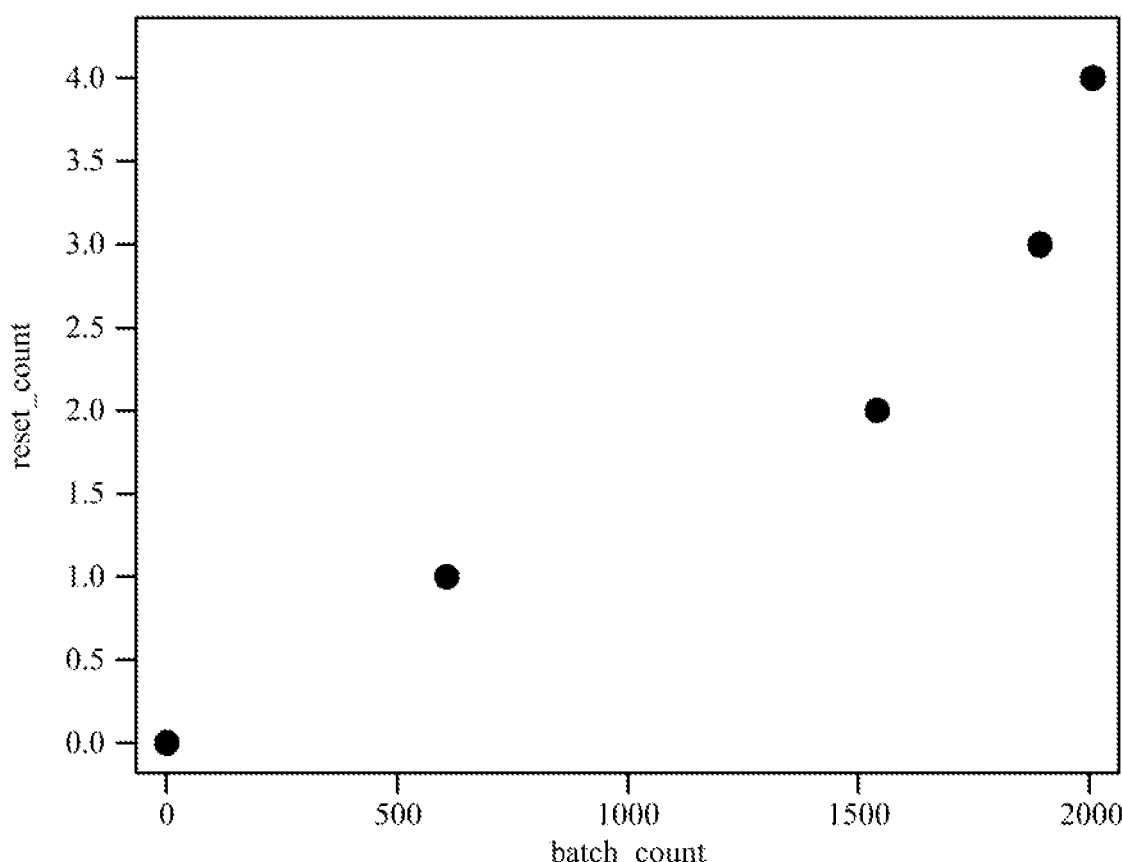

For example, FIG. 6 illustrates how the reset_count values may be incremented by one with every appearance of the fleeting behavior EPC as depicted in FIG. 5. In the example shown in FIG. 6, the fleeting behavior EPC first appears around the first batch with a reset_count of zero. The fleeting behavior EPC reappears around the $500^{th}$ batch and the reset_count is incremented to 1. The fleeting behavior EPC reappears around the $1500^{th}$ batch and the reset_count is incremented to 2. And, the fleeting behavior EPC reappears around batches 1800 and 2000 and the reset count is incremented to 3 and 4, respectively.

Figure 7:
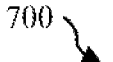
FIG. 7 is a diagram illustrating example reset score values as a function of reset count values, in accordance with various aspects of the present disclosure.
Figure 7:
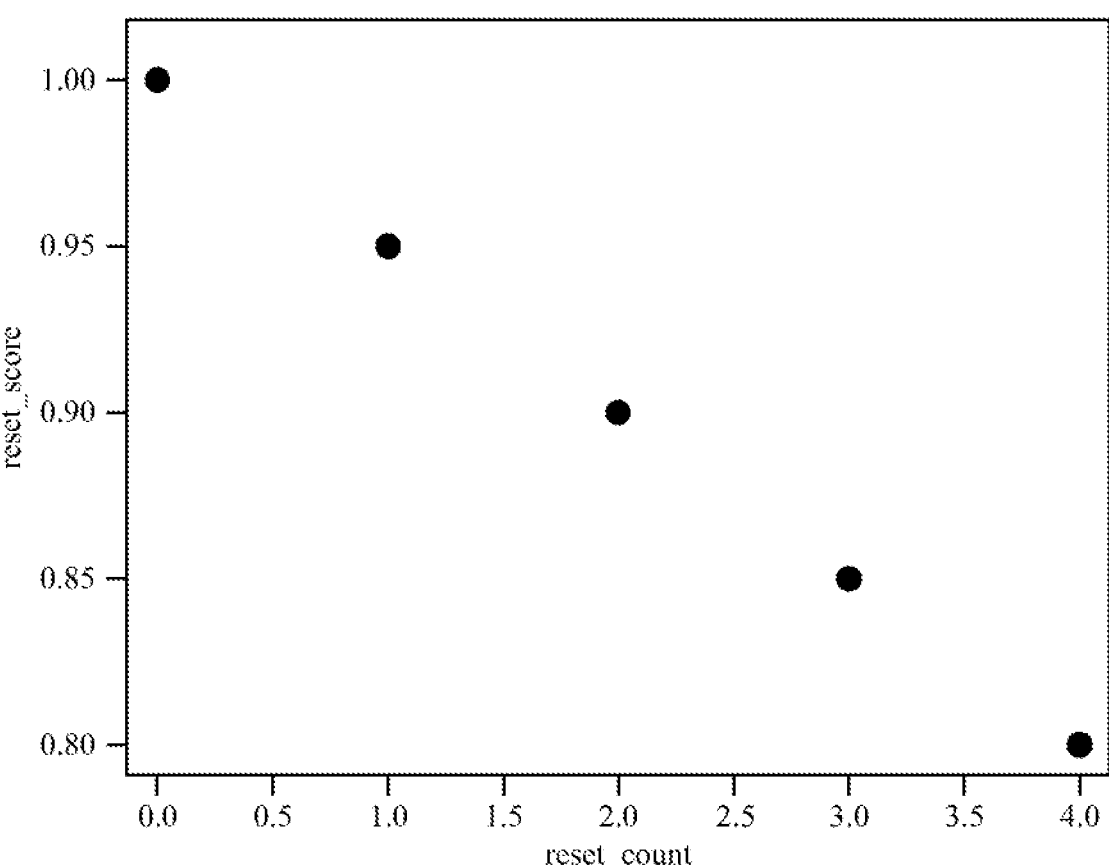

Referring to FIG. 2, the reset score component 238 may be configured to calculate a reset score as follows:

$$\text{reset\_score} = \exp\left(\frac{\log(\text{penalty\_constant})}{5} * \text{reset\_count}\right)$$

where the penalty_constant is a value between 0 and 1.
For example, the penalty_constant may be set to 0.75.
For example, FIG. 7 illustrates reset_score values as a function of reset_count values. In the example shown in FIG. 7, the reset_score value gradually decreases as the reset_count increases.

Figure 8:
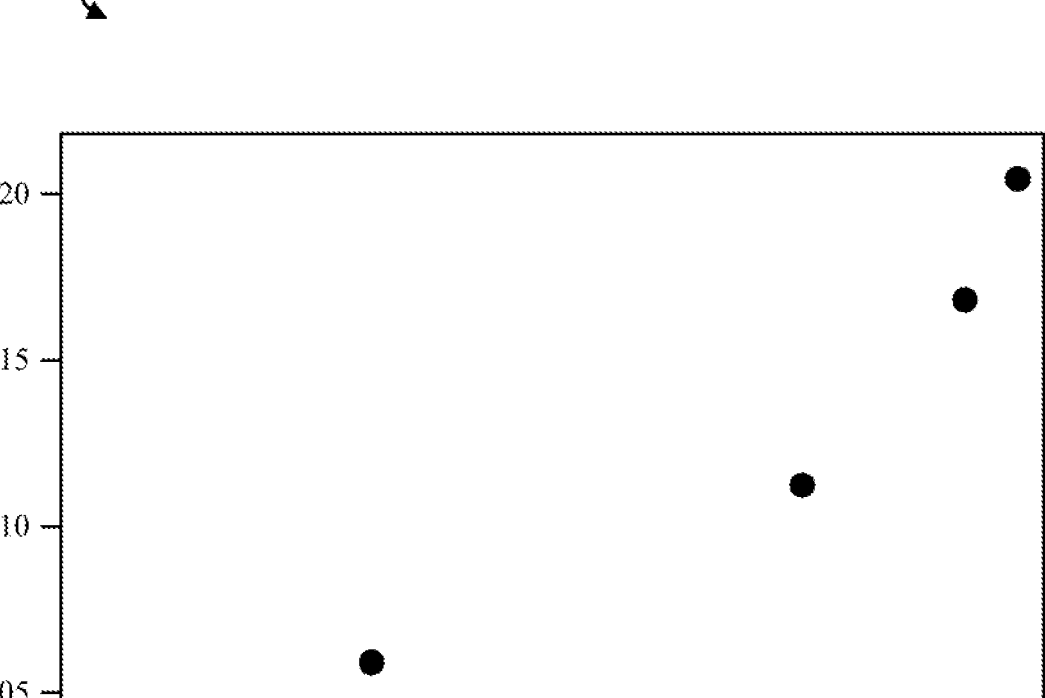
FIG. 8 is a diagram illustrating example chatter score reset values for the second EPC, in accordance with various aspects of the present disclosure.

Referring to FIG. 2, the Stage 1 component 234 may be configured to calculate a modified chatter score as follows:

$$\text{chatter\_score\_reset} = \text{chatter\_score} + (1 - \text{reset\_score})$$

where the penalty_constant is a value between 0 and 1.
For example, the penalty_constant may be set to 0.75.
For example, FIG. 8 illustrates chatter_score_reset values for the fleeting behavior EPC as depicted in FIG. 5. In the example shown in FIG. 8, the fleeting behavior EPC first appears around the first batch with a chatter_score_reset of 1. The fleeting behavior EPC reappears around the $500^{th}$ batch and the chatter_score_reset is recalculated around 1.06. The fleeting behavior EPC reappears around the $1500^{th}$ batch and the chatter_score_reset is recalculated around 1.12. And, the fleeting behavior EPC reappears around batches 1800 and 2000 and the chatter_score_reset is recalculated around 1.16 and 1.22, respectively.

That is, the modified chatter score increases based on a value of the penalty constant, allowing for the Stage 1 component 234 and the Stage 2 component 236 to declare a fleeting behavior EPC as a stray tag.

Figure 9:
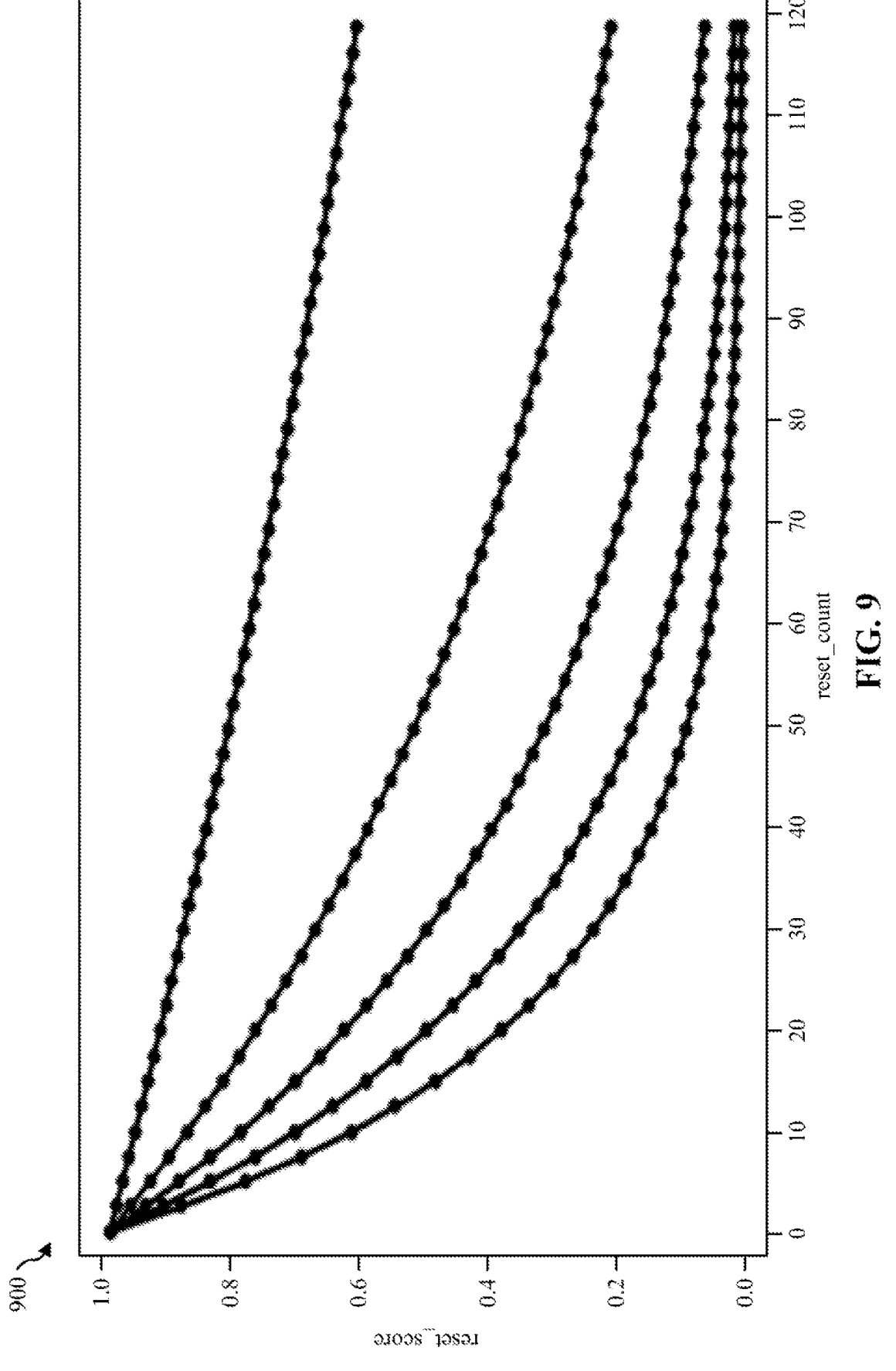
FIG. 9 is a diagram illustrating example reset score values as a function of reset counts for multiple penalty constants, in accordance with various aspects of the present disclosure.

FIG. 9 is a diagram illustrating example reset_score values as a function of reset_count values for multiple penalty constants. That is, the x-axis is plotted with the reset_count and the y-axis is plotted with the reset_score. Each line in the diagram corresponds to a different penalty_constant value. As shown in FIG. 9, varying the value of the penalty_constant changes the impact of the penalization of the modified chatter score for fleeting behavior EPCs.

Referring back to FIG. 2, the stray tag component 110 may be automatically calibrated for a particular retail store scenario. That is, the stray tag component 110 may comprise an auto-calibration component 240 that may be configured to automatically adjust certain parameters utilized by the stray tag component 110 (e.g., the Stage 1 component 234, the Stage 2 component 236). For example, the auto-calibration component 240 may adjust parameters such as the read rate of reader processes 210, the MIN-STEP-TIME parameter, the EPC-COUNT-FILTER parameter, the CONSQ-_BATCHES_THRESHOLD parameter, band thresholds, and the like. The auto-calibration component 240 may adjust the parameters in a self-learning fashion.

In some aspects, the EAS portal 100 may be instructed to enter a setup (or learning) mode. The EAS portal 100 may be allowed to run in the setup mode for a predetermined minimum period of time. While the EAS portal 100 is running in the setup mode, a retail store employee (e.g., an associate) may perform test walks with one or more RFID tags comprising known EPC identification values. The test walks may include walking through the controlled area of the EAS portal 100. Alternatively or additionally, no RFID tags, other than the test RFID tags, may be moved through the controlled area. For example, the known EPC identification values may identify actual moving (e.g., outgoing) tags, rather than stray (e.g., stationary) tags.

The known EPC identification values may be provided to the auto-calibration component 240 either prior to the test or during the setup run time. The auto-calibration component 240 may utilize these known EPC identification values to automatically adjust and/or fine tune the parameters of the stray tag component 110. For example, the auto-calibration component 240 may decrease or increase a sensitivity of the stray tag component 110 to identify an EPC that appears on consecutive batches as a candidate outgoing tag. That is, the auto-calibration component 240 may change chatter score values according to the desired sensitivity (e.g., decrease scores, increase scores). Alternatively or additionally, multiple setup tests may be run until the parameters of the stray tag component 110 are adjusted to provide a desired performance of the stray tag component 110 for the particular retail store scenario.

The auto-calibration component 240 may, for each batch of RFID readings, discard the RFID readings from a particular EPC if or when a quantity of RFID readings from the particular EPC is less than a threshold (e.g., EPC-COUNT-FILTER parameter).

In some aspects, the auto-calibration component 240 may set the MIN-STEP-TIME parameter to a default value (e.g., 2 seconds). In other aspects, the auto-calibration component 240 may reduce or increase a value of the MIN-STEP-TIME parameter according to a distribution of read counts across the batches. For example, the MIN-STEP-TIME parameter may be adjusted to match the read rate of reader processes 210. In another example, the MIN-STEP-TIME parameter may be increased if or when respective read counts for multiple batches do not exceed a threshold. In yet another example, the MIN-STEP-TIME parameter may be decreased if or when the respective read counts for the multiple batches exceeds the threshold.

The auto-calibration component 240 may adjust the chatter score calculation to prevent an EPC that exhibits behavior commensurate with continuous chatter from being considered as a candidate outgoing tag. That is, EPCs that are repeatedly observed across consecutive batches may be chattering EPCs and not indicate an outgoing tag. For example, if or when a particular EPC presents itself for the first time to the system and the particular EPC appears in two consecutive batches, the particular EPC may be considered a good candidate for an outgoing tag and the auto-calibration component 240 may adjust the chatter score for the particular EPC to a maximum chatter score value (e.g., 0.69). In another example, if or when a particular EPC presents itself for the first time to the system and the particular EPC appears in more than two consecutive batches, the particular EPC may be considered a potential chattering EPC and the auto-calibration component 240 may increase the chatter score for the particular EPC above the maximum chatter score value (e.g., 0.69) and allow the chatter score value to continue to increase.

The auto-calibration component 240 may adjust the chatter score calculation to prevent a fleeting EPC from being considered as a candidate outgoing tag. That is, EPCs that are appear and disappear across batches in a cyclic or random fashion may be fleeting EPCs and not indicate an outgoing tag. For example, if or when a particular EPC presents in a first batch and in a second batch, where the first batch and the second batch are sufficiently apart (e.g., exceeds CONSQ_BATCHES_THRESHOLD), the particular EPC may be considered a potential fleeting EPC and the auto-calibration component 240 may adjust the calculation of the chatter score of the particular EPC for the first batch to a first value (e.g., 0.69) and may adjust the calculation of chatter score for the second batch to a second value (e.g., 0.74). The second chatter score value may be higher than the first chatter score value.

In some aspects, the auto-calibration component 240 may adjust a minimum threshold for indicating whether a particular chatter score value indicates a candidate outgoing tag or a stray tag. In other aspects, the auto-calibration component 240 may set the minimum threshold according to one or more of the chatter scores associated with chattering EPCs and/or fleeting EPCs. For example, the auto-calibration component 240 may set the minimum threshold according to the maximum chatter score value associated with chattering EPCs (e.g., 0.69). In another example, the auto-calibration component 240 may set the minimum threshold according to the first chatter score value (e.g., 0.69) or the second chatter score value (e.g., 0.74) associated with fleeting EPCs. In yet another example, the auto-calibration component 240 may set the minimum threshold to a maximum value of the chatter scores associated with chattering EPCs and/or fleeting EPCs (e.g., 0.74).

Alternatively or additionally, the stray tag component 110 may comprise a machine learning component 250 configured to use machine learning techniques for improving the accuracy of the stray tag component 110. For example, the machine learning component 250 may comprise one or more machine learning algorithms (e.g., Extra Trees classifier, Gaussian Naïve Bayes classifier) configured to reduce a number of false alarms of the stray tag component 110. That is, the machine learning component 250 may reduce a number of incorrect classifications of stray tags as moving tags and/or moving tags as stray tags.

In some aspects, the stray tag component 110 may obtain batches of RFID readings at a particular rate. Each reading of the RFID readings may comprise a timestamp, an identification of the RFID reader that received the reading, an identification of the RFID tag (e.g., EPC), an identification of the antenna that received the reading, and a RSSI value, phase angle, and power level of the returned signal. The respective RSSI values of the RFID readings may be normalized RSSI values. That is, the RSSI values may have been normalized by dividing each RSSI value by the transmission power level of the corresponding RFID signal. The respective phase angles of the RFID readings may be adjusted by performing a modulus operation on each phase angle. For example, the phase angles may have been adjusted by a modulus of 2048.

The machine learning component 250 may group the RFID readings captured for each RFID tag during a particular time period (e.g., 6 seconds) into gathering sessions. For example, each session of the gathering sessions may comprise the RFID readings for a particular RFID tag (or EPC) captured within a 6 second time period. The machine learning component 250 may discard sessions that comprise less than a predetermined threshold of RFID readings (e.g., 4). For example, the machine learning component 250 may discard a session if or when the session comprises less than four readings.

The machine learning component 250 may calculate one or more features for each session of the gathering sessions. The features may be calculated based at least on the values comprised by each of the RFID readings in each corresponding session. In some aspects, features may be categorized into a plurality of categories. For example, features may be divided into two categories, namely, temporal features and sessional features. The temporal features may relate to time-based characteristics of the session. For example, the temporal features may keep track of the antenna, RSSI, and phase angles for the current (or last) reading and one or two previous readings in the session. The sessional features may relate to descriptive characteristics of the session. For example, the sessional features may keep track of an average RSSI and phase angles of a session. Table 1 provides a list of example features that may be calculated by the machine learning component 250. Each feature has a name and a corresponding description. Features may be referenced by their name hereafter.

TABLE 1

| | Feature Name | Feature Description |
|---|---|---|
| 1 | antennaPort | antennaPort of current read at time t |
| 2 | port_t1 | antennaPort of read at time t-1 |
| 3 | port_t2 | antennaPort of read at time t-2 |
| 4 | rssi_power | (RSSI/transmission power) of current read at time t |
| 5 | rssi_power_t1 | (RSSI/transmission power) of read at time t-1 |
| 6 | rssi_power_t2 | (RSSI/transmission power) of read at time t-2 |

TABLE 1-continued

| | Feature Name | Feature Description |
|---|---|---|
| 7 | rssi_std | Standard deviation of rssi_power in gathering session |
| 8 | rssi_min | Minimum rssi_power in gathering session |
| 9 | rssi_max | Maximum rssi_power in gathering session |
| 10 | rssi_mean | Average rssi_power in gathering session |
| 11 | rssi_skew | Skewness of rssi_power in gathering session |
| 12 | rssi_diff | Difference between minimum and maximum rssi_power in gathering session |
| 13 | rssi_CoV | (Standard deviation/Average) of rssi_power in gathering session |
| 14 | angle_2048 | (Phase angle MOD 2048) of current read at time t |
| 15 | angle_t1 | (Phase angle MOD 2048) of read at time t-1 |
| 16 | angle_t2 | (Phase angle MOD 2048) of read at time t-2 |
| 17 | angle_std | Standard deviation of angle_2048 in gathering session |
| 18 | angle_min | Minimum angle_2048 in gathering session |
| 19 | angle_max | Maximum angle_2048 in gathering session |
| 20 | angle_mean | Average angle_2048 in gathering session |
| 21 | angle_skew | Skewness of angle_2048 in gathering session |
| 22 | angle_diff | Difference between minimum and maximum angle_2048 in gathering session |
| 23 | angle_CoV | (Standard deviation/Average) of angle_2048 in gathering session |
| 24 | current_length | Number of reads in the gathering session at time t |
| 25 | rssi_vel_mean | ((most recent rssi) − (oldest rssi) in the gathering session )/rssi_mean |
| 26 | angle_vel_mean | ((most recent angle_2048) − (oldest angle_2048) in the gathering session )/angle_mean |

The machine learning component 250 may determine according to at least one or more machine learning algorithms whether each session in the gathering sessions corresponds to a stray (e.g., stationary) tag or a moving (e.g., outgoing) tag. That is, the machine learning component 250 may filter the gathering sessions using one or more machine learning algorithms to identify sessions that correspond to a RFID tag that is moving. In some aspects, the stray tag component 110 may provide, to the system controller 108, the EPCs that have been declared as moving tags by the machine learning component 250. In response, the system controller 108 may trigger an alarm based at least one a determination that one or more of the EPCs is not authorized to leave the EAS portal zone (e.g., either based on the tag being detected, or based on data on the tag not indicating that the item is purchased).

The machine learning component 250 may implement one or more machine learning algorithms with at least a portion of the aforementioned features. That is, a machine learning algorithm may determine whether a particular session corresponds to a stray tag or to a moving tag based on an analysis of a portion of the features corresponding to the particular session.

In some aspects, the machine learning component 250 may be configured to implement a machine learning algorithm with a particular configuration and to use the output from the machine learning algorithm to determine whether a session corresponds to a stray tag or to a moving tag. For example, the machine learning component 250 may implement a Gaussian Naïve Bayes classifier algorithm. The Gaussian Naïve Bayes classifier algorithm may be configured to analyze a portion of the features (e.g., 19 features) to determine whether a particular session corresponds to a stray tag or to a moving tag. In another example, the machine learning component 250 may implement an Extra Trees classifier algorithm. The Extra Trees classifier algorithm may be configured with a certain number of estimators (e.g., 500 estimators) to analyze a portion of the features (e.g., 25 features) to determine whether a particular session corresponds to a stray tag or to a moving tag.

In other aspects, the machine learning component 250 may be configured to implement two or more machine learning algorithms with corresponding configurations and to use the output from the two or more machine learning algorithms, independently or in combination, to determine whether a particular session corresponds to a stray tag or to a moving tag. For example, the machine learning component 250 may implement the Gaussian Naïve Bayes classifier algorithm and the Extra Trees classifier algorithm. In such an example, the machine learning component 250 may combine the results from the Gaussian Naïve Bayes classifier algorithm and the Extra Trees classifier algorithm to determine whether a particular session corresponds to a stray tag or to a moving tag. In some aspects, the machine learning component 250 may apply a corresponding weight to the results from each of the machine learning algorithms prior to, or as part of, combining the results from the two or more machine learning algorithms.

Aspects of the present disclosure may be implemented using hardware, software, or a combination thereof and may be implemented in one or more computer systems or other processing systems. In an aspect of the present disclosure, features are directed toward one or more computer systems capable of carrying out the functionality described herein. An example of such a computer system is shown in FIG. 10.

Figure 10:
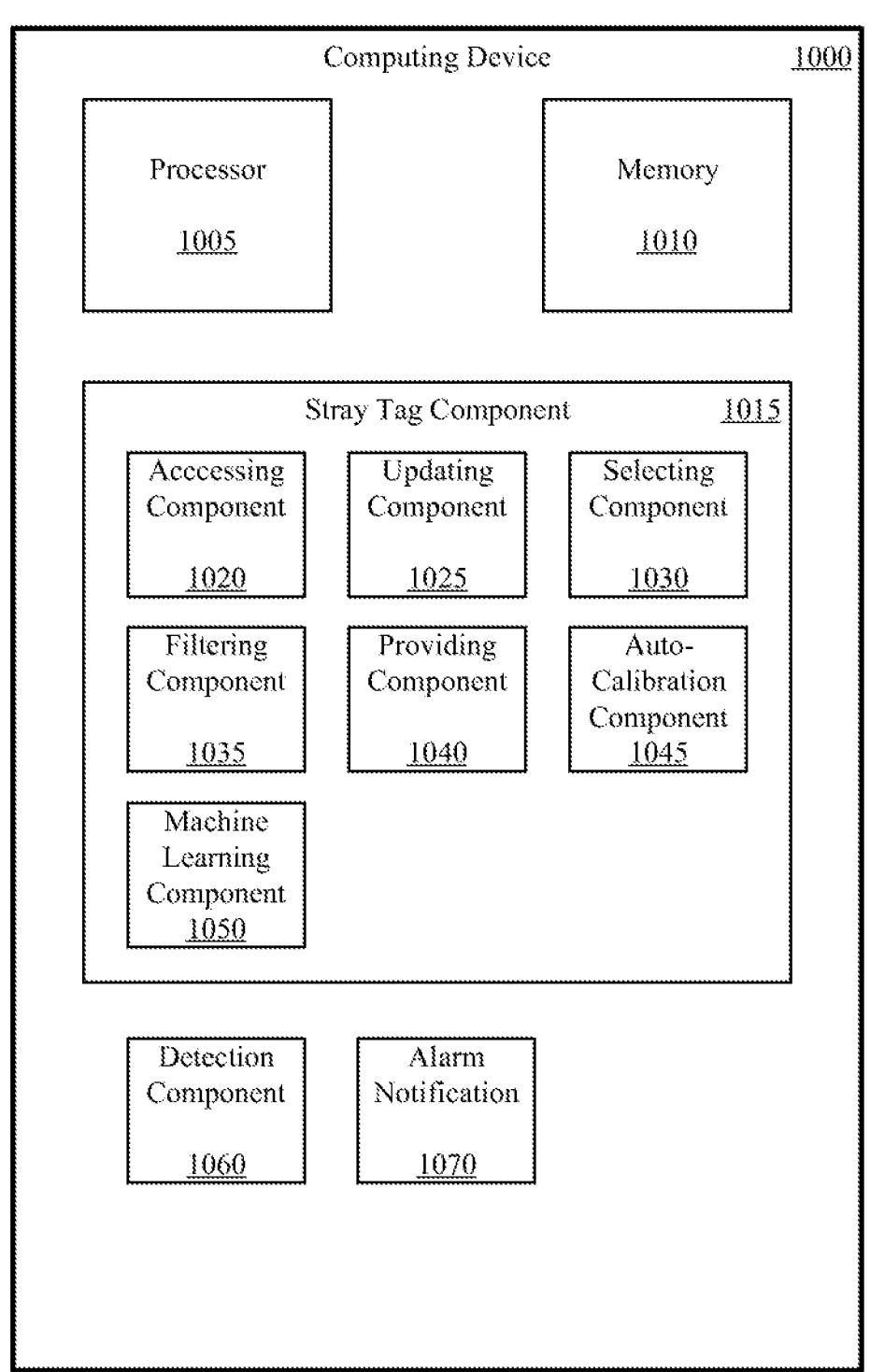
FIG. 10 is a diagram illustrating an example apparatus, in accordance with various aspects of the present disclosure.

FIG. 10 is a block diagram of an example apparatus 1000. The apparatus 1000 may be an EAS portal 100, a system controller 108, or an EAS portal 100 may include an apparatus 1000. In some aspects, the apparatus 1000 may comprise one or more processors, such as processor 1005, configured to execute, in conjunction with memory 1010, various software implementations of the functionality described herein. In other aspects, the apparatus 1000 may comprise a stray tag component 1015 (e.g., the stray tag component 110) for declaring RFID tags as stray tags.

In some aspects, the apparatus 1000 may be configured to perform one or more operations described herein in connection with FIGS. 1-9. Alternatively or additionally, the apparatus 1000 may be configured to perform one or more processes described herein, such as methods 1100-1300 of FIGS. 11-13, respectively. In some aspects, the apparatus 1000 may include one or more components of the stray tag components or EAS system 100 described above in connection with FIGS. 1-2.

The stray tag component 1015 may comprise an accessing component 1020 for accessing, from a queue, a batch of RFID readings received by a plurality of RFID readers of an EAS system. The batch of RFID readings may be associated with a batch count value. Each RFID reading in the batch of RFID readings may comprise a RFID identification of a corresponding RFID tag that generated the RFID reading.

The stray tag component 1015 may comprise an updating component 1025 for updating a RFID reading history with the batch of RFID readings.

The stray tag component 1015 may comprise a selecting component 1030 for selecting a first set of RFID identifications from the batch of RFID readings. Each RFID identification of the first set of RFID identifications may have a corresponding chatter score below a chatter score threshold. Each corresponding chatter score may be calculated according to the RFID reading history.

The stray tag component 1015 may comprise a filtering component 1035 for filtering the first set of RFID identifications resulting in a second set of RFID identifications.

Each RFID identification in the second set of RFID identifications may correspond to a RFID tag in motion.

The stray tag component 1015 may comprise a providing component 1040 for providing, to the EAS system, the second set of RFID identifications, causing the EAS system to alarm based on a determination that one or more RFID tags identified by the second set of RFID identifications are not authorized to leave a controlled area associated with the plurality of RFID readers.

The stray tag component 1015 may comprise an auto-calibration component 1045 for automatically determining a scatter score threshold as described above with regard to FIG. 2.

The stray tag component 1015 may comprise a machine learning component 1050 for determining a set of RFID identifications from a batch of RFID readings according to at least one or more machine learning algorithms, as described above with regard to FIG. 2. Each RFID identification of the set of RFID identifications corresponds to a RFID tag in motion.

The computing device 1000 may comprise a detection component 1060 for receiving the second set of RFID identifications from the providing component 1040, and causing the alarm notification 1070 based on a determining that one or more RFID tags identified by the second set of RFID identifications are not authorized to leave a controlled area associated with the plurality of RFID readers. In some aspects, the alarm notification 1070 may be a visual notification, audible notification, or electronic communication (e.g., text message, email, etc.).

Referring to FIG. 11, in operation, a processor may perform a method 1100 of EAS. The method 1100 may be performed by the EAS portal 100 (which may be the entire EAS portal 100 or a component of the EAS portal such as the system controller 108, the stray tag component 110, or processor 1005. The method 1100 may be performed by the stray tag component 110 in communication with the queue 220 and the system controller 108.

In block 1102 of FIG. 11, the method 1100 may include accessing, by a processor of an EAS system from a queue, a batch of RFID readings received by a plurality of RFID readers of the EAS system, the batch of RFID readings being associated with a batch count value, and each RFID reading in the batch of RFID readings comprising a RFID identification of a corresponding RFID tag that generated the RFID reading. For example, in an aspect, the stray tag component 110, the system controller 108, and/or processor 1005 may be configured to or may comprise the means for accessing, by a processor 110 of an EAS system 100 from a queue 220, a batch of RFID readings received by a plurality of RFID readers 106 of the EAS system 100, the batch of RFID readings being associated with a batch count value, and each RFID reading in the batch of RFID readings comprising a RFID identification of a corresponding RFID tag that generated the RFID reading.

For example, the accessing in block 1102 may include sweeping a batch of RFID readings from the queue 220 at a set interval. In some aspects, the stray tag component 110 may be configured to extract all RFID readings from the queue 220 during each sweep. In other aspects, the stray tag component 110 may be configured to process a portion of the previous queue contents with the current batch RFID readings. In yet other aspects, the stray tag component 110 may be configured to extract and process the RFID readings from the queue 220 if or when a quantity of RFID readings in the queue 220 reaches or exceeds a threshold.

Further, for example, the accessing in block 1102 may be performed to facilitate processing of the RFID readings. And, as such, allowing for the mitigation of false alarms caused by stray tags.

In block 1104 of FIG. 11, the method 1100 may include updating, by the processor, a RFID reading history with the batch of RFID readings. For example, in an aspect, the stray tag component 110, the update history component 232, the system controller 108, and/or processor 1005 may be configured to or may comprise the means for updating, by the processor 110, a RFID reading history with the batch of RFID readings.

For example, the updating in block 1104 may include creating a new entry or updating an existing entry in an EPC history for EPCs identified in the batch of RFID readings.

Further, for example, the updating in block 1104 may be performed to calculate and store values that may be used to identify stray tags in the batch of RFID readings.

In block 1106 of FIG. 11, the method may include selecting, by the processor, a first set of RFID identifications from the batch of RFID readings, each RFID identification of the first set of RFID identifications having a corresponding chatter score below a chatter score threshold, each corresponding chatter score being calculated according to the RFID reading history. For example, in an aspect, the stray tag component 110, the Stage 1 component 234, the system controller 108, and/or processor 1005 may be configured to or may comprise the means for selecting a first set of RFID identifications from the batch of RFID readings, each RFID identification of the first set of RFID identifications having a corresponding chatter score below a chatter score threshold, each corresponding chatter score being calculated according to the RFID reading history.

For example, the selecting in block 1106 may include calculating a chatter score for EPCs identified in the batch of RFID readings. First EPCs with respective chatter scores that exceed a chatter score threshold may be considered stray tags. That is, the first EPCs may be associated with stationary RFID tags to appear to be moving due to radio interference and the like. Second EPCs with respective chatter scores that do not exceed the chatter score threshold may be processed further. That is, the second EPCs may be selected as candidates for moving (e.g., outgoing) tags.

Further, for example, the selecting in block 1106 may be performed to implement a first pass for filtering out RFID readings that exhibit behavior commensurate with stray tags. And, as such, mitigate false alarms potentially caused by the stray tags. Thereby, increasing accuracy and effectiveness over conventional EAS systems.

In block 1108, the method 1100 may include filtering, by the processor, the first set of RFID identifications resulting in a second set of RFID identifications, each RFID identification in the second set of RFID identifications corresponding to a RFID tag in motion. For example, in an aspect, the stray tag component 110, the Stage 2 component 236, the system controller 108, and/or processor 1005 may be configured to or may comprise the means for filtering the first set of RFID identifications resulting in a second set of RFID identifications, each RFID identification in the second set of RFID identifications corresponding to a RFID tag 120 in motion.

For example, the filtering at block 1108 may include calculating a read rate, an antenna entropy, a reader entropy, and a read burst for EPCs identified in the first set of RFID identifications. The filtering at block 1108 may further include determining whether or not the EPCs identified in the first set of RFID identifications are stray tags. The determination may be based on a decision tree.

Further, for example, the filtering in block 1108 may be performed to implement a second pass for filtering out RFID readings that exhibit behavior commensurate with stray tags. And, as such, further mitigate false alarms potentially caused by the stray tags. Thereby, increasing accuracy and effectiveness over conventional EAS systems.

In block 1110, the method 1100 may include providing, by the stray tag filtering system to the EAS system, the second set of RFID identifications, causing the EAS system to alarm based on a determination that one or more RFID tags identified by the second set of RFID identifications are not authorized to leave a controlled area associated with the plurality of RFID readers. For example, in an aspect, the stray tag component 110, the providing component 1040, the system controller 108, and/or processor 1005 may be configured to or may comprise the means for providing the second set of RFID identifications to another component of the EAS system 100 (e.g., the detection component 1060) configured to trigger the alarm notification 1070 based on a determination that one or more RFID tags identified by the second set of RFID identifications are not authorized to leave a controlled area associated with the plurality of RFID readers.

In an additional or optional aspect having automatic calibration features that may be combined with any other aspect herein, the method 1100 may include the steps of: accessing, by a processor of an EAS system from a queue, a batch of RFID readings received by a plurality of RFID readers of the EAS system, the batch of RFID readings being associated with a batch count value, and each RFID reading in the batch of RFID readings comprising a RFID identification of a corresponding RFID tag that generated the RFID reading; updating, by the processor, a RFID reading history with the batch of RFID readings; automatically calibrating, by the processor, a chatter score threshold; selecting, by the processor, a first set of RFID identifications from the batch of RFID readings, each RFID identification of the first set of RFID identifications having a corresponding chatter score below the chatter score threshold, each corresponding chatter score being calculated according to the RFID reading history; filtering, by the processor, the first set of RFID identifications resulting in a second set of RFID identifications, each RFID identification in the second set of RFID identifications corresponding to a RFID tag in motion; and providing, by the processor to the EAS system, the second set of RFID identifications, causing the EAS system to alarm based on a determination that one or more RFID tags identified by the second set of RFID identifications are not authorized to leave a controlled area associated with the plurality of RFID readers.

In another additional or optional aspect having machine learning features that may be combined with any other aspect herein, the method 1100 may include the steps of: accessing, by a processor of an EAS system from a queue, a batch of RFID readings received by a plurality of RFID readers of the EAS system, the batch of RFID readings having been received during a particular time period, each RFID reading in the batch of RFID readings comprising a RFID identification of a corresponding RFID tag that generated the RFID reading, and the batch of RFID readings comprising a minimum quantity of RFID readings for each corresponding RFID tag; determining a set of RFID identifications from the batch of RFID readings according to at least one machine learning algorithm, each RFID identification in the set of RFID identifications corresponding to a RFID tag in motion; and providing, by the processor to the EAS system, the set of RFID identifications, causing the EAS system to alarm based on a determination that one or more RFID tags identified by the set of RFID identifications are not authorized to leave a controlled area associated with the plurality of RFID readers.

Referring to FIG. 12, in operation, a processor may perform a method 1200 of EAS. The method 1200 may be performed by the EAS portal 100 (which may be the entire EAS portal 100 or a component of the EAS portal such as the system controller 108, the stray tag component 110, or processor 1005. The method 1200 may be performed by the stray tag component 110 in communication with the queue 220 and the system controller 108.

In block 1202 of FIG. 12, the method 1200 may include determining, by a processor of an EAS system, a chatter score of a RFID identification of a RFID tag that generated one or more RFID readings at one or more RFID readers. For example, the stray tag component may sweep a batch of RFID readings from the queue 220 at a set interval. Further, the Stage 1 component 234 may calculate a chatter score for EPCs identified in the batch of RFID readings, as described in detail herein.

Accordingly, the EAS system 100, the system controller 108, the computing device 1000, and/or the processor 1005 executing the stray tag component 110, and/or Stage 1 component 234 may provide means for determining a chatter score of a RFID identification of a RFID tag that generated one or more RFID readings at one or more RFID readers.

In block 1204 of FIG. 12, the method 1200 may include selecting, by the processor of the EAS system, the RFID identification based at least in part on the chatter score being below a chatter score threshold. For example, the selecting component 1030 may select first EPCs with respective chatter scores that exceed a chatter score threshold may be considered stray tags. That is, the first EPCs may be associated with stationary RFID tags to appear to be moving due to radio interference and the like. Second EPCs with respective chatter scores that do not exceed the chatter score threshold may be processed further. That is, the second EPCs may be selected as candidates for moving (e.g., outgoing) tags.

Further, for example, the selecting in block 1106 may be performed to implement a first pass for filtering out RFID readings that exhibit behavior commensurate with stray tags. And, as such, mitigate false alarms potentially caused by the stray tags. Thereby, increasing accuracy and effectiveness over conventional EAS systems.

Accordingly, the EAS system 100, the system controller 108, the computing device 1000, and/or the processor 1005 executing the stray tag component 110, Stage 1 component 234, and/or the selecting component 1030 may provide means for selecting the RFID identification based at least in part on the chatter score being below a chatter score threshold.

In block 1206 of FIG. 12, the method may include determining, by the processor of the EAS system, that the RFID identification corresponds to a RFID tag in motion. For example, the Stage 2 component 236 may calculate a read rate, an antenna entropy, a reader entropy, and a read burst for EPCs identified in the first set of RFID identifications. Further, the Stage 2 component 236 may determine whether or not the EPCs identified in the first set of RFID identifications are stray tags. In some aspects, the determination may be based on a decision tree.

Accordingly, the EAS system 100, the system controller 108, the computing device 1000, and/or the processor 1005 executing the stray tag component 110, Stage 2 component 236, and/or the filtering component 1035 may provide means for determining that the RFID identification corresponds to a RFID tag in motion.

In block 1208, the method 1200 may include triggering, by the processor of the EAS system, an alarm based on a determination that the RFID tag identified by the RFID identification is not authorized to leave a controlled area associated with the one or more RFID readers. For example, the providing component 1040 may provide the RFID identification to a detection component 1060 that causes the alarm notification 1070 based on unauthorized movement out of a controlled area by the RFID tag identified by the RFID identification.

Accordingly, the EAS system 100, the system controller 108, the computing device 1000, and/or the processor 1005 executing the stray tag component 110 may provide means for triggering an alarm based on a determination that the RFID tag identified by the RFID identification is not authorized to leave a controlled area associated with the one or more RFID readers.

Referring to FIG. 13, in operation, a processor may perform a method 1300 of EAS. The method 1300 may be performed by the EAS portal 100 (which may be the entire EAS portal 100 or a component of the EAS portal such as the system controller 108, the stray tag component 110, or processor 1005. The method 1300 may be performed by the stray tag component 110 in communication with the queue 220 and the system controller 108.

In block 1302 of FIG. 13, the method 1300 may include retrieving, by the processor of the EAS system, one or more RFID readings from a queue including a plurality of RFID readings received by a plurality of RFID readers of an EAS system, the one or more RFID readings generated by a RFID tag. For example, the stray tag component 110 may sweeping a batch of RFID readings from the queue 220 at a set interval.

Accordingly, the EAS system 100, the system controller 108, the computing device 1000, and/or the processor 1005 executing the stray tag component 110, and/or the machine learning component 250 may provide means for retrieving one or more RFID readings from a queue including a plurality of RFID readings received by a plurality of RFID readers of an EAS system, the one or more RFID readings generated by a RFID tag.

In block 1304 of FIG. 13, the method 1300 may include determining, by the processor of the EAS system, a plurality of input values for the RFID tag, each input value of the plurality of input values corresponding to a temporal and/or sessional feature associated with a machine learning model. For example, the machine learning component 250 may group the RFID readings captured for each RFID tag during a particular time period (e.g., 6 seconds) into gathering sessions. Each reading of the RFID readings may comprise a timestamp, an identification of the RFID reader that received the reading, an identification of the RFID tag (e.g., EPC), an identification of the antenna that received the reading, and a RSSI value, phase angle, and power level of the returned signal. The respective RSSI values of the RFID readings may be normalized RSSI values. That is, the RSSI values may have been normalized by dividing each RSSI value by the transmission power level of the corresponding RFID signal. The respective phase angles of the RFID readings may be adjusted by performing a modulus operation on each phase angle. For example, the phase angles may have been adjusted by a modulus of 2048.

Further, the machine learning component 250 may calculate one or more features for each session of the gathering sessions. The temporal features may relate to time-based characteristics of the session. For example, the temporal features may keep track of the antenna, RSSI, and phase angles for the current (or last) reading and one or two previous readings in the session. The sessional features may relate to descriptive characteristics of the session. For example, the sessional features may keep track of an average RSSI and phase angles of a session.

Accordingly, the EAS system 100, the system controller 108, the computing device 1000, and/or the processor 1005 executing the stray tag component 110, and/or the machine learning component 250 may provide means for determining a plurality of input values for the RFID tag, each input value of the plurality of input values corresponding to a temporal and/or sessional feature associated with a machine learning model.

In block 1306 of FIG. 13, the method may include determining, by the processor of the EAS system, that the RFID tag is in motion based at least in part on the plurality of input values and the machine learning model. For example, the machine learning component 250 may determine according to at least one or more machine learning algorithms whether each session in the gathering sessions corresponds to a stray (e.g., stationary) tag or a moving (e.g., outgoing) tag based on the temporal and session features of the machine learning algorithms. That is, the machine learning component 250 may filter the gathering sessions using one or more machine learning algorithms to identify gathering sessions that correspond to a RFID tag that is moving.

Accordingly, the EAS system 100, the system controller 108, the computing device 1000, and/or the processor 1005 executing the stray tag component 110 and/or the machine learning component 1050 may provide means for determining that the RFID identification corresponds to a RFID tag in motion.

In block 1308, the method 1300 may include triggering, by the processor of the EAS system, an alarm based on a determination that the RFID tag identified is not authorized to leave a controlled area associated with the one or more RFID readers. For example, the stray tag component 110 may provide, to the system controller 108, the EPCs that have been declared as moving tags by the machine learning component 250. In response, the system controller 108 may trigger an alarm based at least on a determination that one or more of the EPCs is not authorized to leave the EAS portal zone (e.g., either based on the tag being detected, or based on data on the tag not indicating that the item is purchased).

Accordingly, the EAS system 100, the system controller 108, the computing device 1000, and/or the processor 1005 executing the stray tag component 110 may provide means for triggering an alarm based on a determination that the RFID tag identified is not authorized to leave a controlled area associated with the one or more RFID readers.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims.

Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of electronic article surveillance ("EAS"), comprising:

determining, by a processor of an EAS system, a chatter score of a radio frequency identification (RFID) identification of a RFID tag that generated one or more RFID readings at one or more RFID readers, wherein the chatter score represents an amount of detected noise in the one or more RFID readings associated with the RFID identification;

designating, by the processor of the EAS system, the RFID tag as a stray tag responsive to the chatter score being above a chatter score threshold;

omitting, by the processor of the EAS system, the RFID tag designated as the stray tag from further processing;

selecting, by the processor of the EAS system, the RFID identification based at least in part on the chatter score being below the chatter score threshold;

determining, by the processor of the EAS system, that the RFID identification corresponds to a RFID tag in motion; and triggering, by the processor of the EAS system, an alarm based on a determination that the RFID tag identified by the RFID identification is not authorized to leave a controlled area associated with the one or more RFID readers.

2. The method of claim 1, further comprising:

retrieving the one or more RFID readings from a queue including a plurality of RFID readings received by a plurality of RFID readers of the EAS system.

3. The method of claim 1, further comprising:

determining RFID reading history for the RFID identification, the RFID reading history including:

an initial batch count value;

a current batch count value; and a consequent batch count value, wherein determining the chatter score comprises:

calculating, the chatter score based on at least one of the initial batch count value, the current batch count value, or the consequent batch count value.

4. The method of claim 1, further comprising:

determining RFID reading history for the RFID identification, the RFID reading history including:

an initial batch count value;

a current batch count value;

a consequent batch count value; and a reset count, wherein determining the chatter score comprises:

calculating, for the RFID identification, a reset score based on the reset count; and calculating the chatter score based on the initial batch count value, the current batch count value, and the reset score.

5. The method of claim 1, wherein determining that the RFID identification corresponds to the RFID tag in motion, comprises:

determining that the RFID identification corresponds to the RFID tag in motion based at least in part on one of a read rate, antenna entropy, reader entropy, or read burst.

6. The method of claim 1, wherein determining that the RFID identification corresponds to the RFID tag in motion, comprises:

determining that the RFID identification corresponds to the RFID tag in motion based at least in part on a decision tree.

7. The method of claim 1, wherein determining that the RFID identification corresponds to the RFID tag in motion, comprises:

determining that the RFID identification corresponds to the RFID tag in motion based at least in part on a machine learning model.

8. The method of claim 1, wherein the RFID identification is a first RFID identification, the RFID tag is a first RFID tag, the chatter score is a first chatter score, the chatter score threshold is a first chatter score threshold, the alarm is a first alarm, and further comprising:

determining a second chatter score threshold by performing an automatic calibration process based on historic chatter information;

determining, by the processor of the EAS system, a second chatter score of a second RFID identification of a second RFID tag that generated a plurality of RFID readings at the one or more RFID readers;

selecting, by the processor of the EAS system, the second RFID identification based at least in part on the second chatter score being below the second chatter score threshold;

determining, by the processor of the EAS system, that the second RFID identification corresponds to the RFID tag in motion; and triggering, by the processor of the EAS system, a second alarm based on a determination that the second RFID tag identified by the second RFID identification is not authorized to leave the controlled area associated with the one or more RFID readers.

9. A non-transitory computer-readable device having instructions thereon that, when executed by at least one computing device, causes the at least one computing device to perform operations comprising:

determining, by a processor of an EAS system, a chatter score of a radio frequency identification (RFID) identification of a RFID tag that generated one or more RFID readings at one or more RFID readers, wherein the chatter score represents an amount of detected noise in the one or more RFID readings associated with the RFID identification;

designating, by the processor of the EAS system, the RFID tag as a stray tag responsive to the chatter score being above a chatter score threshold;

omitting, by the processor of the EAS system, the RFID tag designated as the stray tag from further processing;

selecting, by the processor of the EAS system, the RFID identification based at least in part on the chatter score being below the chatter score threshold;

determining, by the processor of the EAS system, that the RFID identification corresponds to a RFID tag in motion; and triggering, by the processor of the EAS system, an alarm based on a determination that the RFID tag identified by the RFID identification is not authorized to leave a controlled area associated with the one or more RFID readers.

10. The non-transitory computer-readable device of claim 9, further comprising:

retrieving the one or more RFID readings from a queue including a plurality of RFID readings received by a plurality of RFID readers of the EAS system.

11. The non-transitory computer-readable device of claim 9, further comprising:

determining RFID reading history for the RFID identification, the RFID reading history including:

an initial batch count value;

a current batch count value; and a consequent batch count value, wherein determining the chatter score comprises:

calculating, the chatter score based on at least one of the initial batch count value, the current batch count value, or the consequent batch count value.

12. The non-transitory computer-readable device of claim 9, further comprising:

determining RFID reading history for the RFID identification, the RFID reading history including:

an initial batch count value;

a current batch count value;

a consequent batch count value; and a reset count, wherein determining the chatter score comprises:

calculating, for the RFID identification, a reset score based on the reset count; and calculating the chatter score based on the initial batch count value, the current batch count value, and the reset score.

13. The non-transitory computer-readable device of claim 9, wherein determining that the RFID identification corresponds to the RFID tag in motion, comprises:

determining that the RFID identification corresponds to the RFID tag in motion based at least in part on one of a read rate, antenna entropy, reader entropy, or read burst.

14. The non-transitory computer-readable device of claim 9, wherein determining that the RFID identification corresponds to the RFID tag in motion, comprises:

determining that the RFID identification corresponds to the RFID tag in motion based at least in part on a decision tree.

15. The non-transitory computer-readable device of claim 9, wherein determining that the RFID identification corresponds to the RFID tag in motion, comprises:

determining that the RFID identification corresponds to the RFID tag in motion based at least in part on a machine learning model.

16. The non-transitory computer-readable device of claim 9, wherein the RFID identification is a first RFID identification, the RFID tag is a first RFID tag, the chatter score is a first chatter score, the chatter score threshold is a first chatter score threshold, the alarm is a first alarm, and further comprising:

determining a second chatter score threshold by performing an automatic calibration process based on historic chatter information;

determining, by the processor of the EAS system, a second chatter score of a second RFID identification of a second RFID tag that generated a plurality of RFID readings at the one or more RFID readers;

selecting, by the processor of the EAS system, the second RFID identification based at least in part on the second chatter score being below the second chatter score threshold;

determining, by the processor of the EAS system, that the second RFID identification corresponds to the RFID tag in motion; and triggering, by the processor of the EAS system, a second alarm based on a determination that the second RFID tag identified by the second RFID identification is not authorized to leave the controlled area associated with the one or more RFID readers.

17. An electronic article surveillance (EAS) system, comprising:

a plurality of radio frequency identification (RFID) readers;

a RFID tag associated with a RFID identification;

a memory storing instructions thereon; and at least one processor coupled with the memory and configured by the instructions to:

determine a chatter score of the RFID identification of the RFID tag that generated one or more RFID readings at one or more RFID readers of the plurality of RFID readers, wherein the chatter score represents an amount of detected noise in the one or more RFID readings associated with the RFID identification;

designate the RFID tag as a stray tag responsive to the chatter score being above a chatter score threshold;

omit the RFID tag designated as the stray tag from further processing;

select the RFID identification based at least in part on the chatter score being below the chatter score threshold;

determine that the RFID identification corresponds to a RFID tag in motion; and trigger an alarm based on a determination that the RFID tag identified by the RFID identification is not authorized to leave a controlled area associated with the one or more RFID readers.

18. The EAS system of claim 17, wherein the at least one processor is further configured by the instructions to:

determine RFID reading history for the RFID identification, the RFID reading history including:

an initial batch count value;

a current batch count value; and a consequent batch count value, wherein to determine the chatter score, the at least one processor is further configured by the instructions to:

calculate the chatter score based on at least one of the initial batch count value, the current batch count value, or the consequent batch count value.

19. The EAS system of claim 17, wherein the at least one processor is further configured by the instructions to:

determine RFID reading history for the RFID identification, the RFID reading history including:

an initial batch count value;

a current batch count value;

a consequent batch count value; and a reset count, wherein to determine the chatter score, the at least one processor is further configured by the instructions to:

calculate, for the RFID identification, a reset score based on the reset count; and calculate the chatter score based on the initial batch count value, the current batch count value, and the reset score.

20. The EAS system of claim 17, wherein to determine that the RFID identification corresponds to the RFID tag in motion, the at least one processor is further configured by the instructions to:

determine that the RFID identification corresponds to the RFID tag in motion based at least in part on one of a read rate, antenna entropy, reader entropy, or read burst.

21. The EAS system of claim 17, wherein to determine that the RFID identification corresponds to the RFID tag in motion, the at least one processor is further configured by the instructions to:

determine a plurality of input values for the RFID tag, each input value of the plurality of input values corresponding to a temporal and/or sessional feature associated with a machine learning model; and determine that the RFID tag is in motion based at least in part on the plurality of input values and the machine learning model.

22. A method of electronic article surveillance ("EAS"), comprising:

determining, by a processor of an EAS system, a chatter score of a radio frequency identification (RFID) identification of a RFID tag that generated one or more RFID readings at one or more RFID readers of a plurality of RFID readers of the EAS system, wherein the chatter score represents an amount of detected noise in the one or more RFID readings associated with the RFID identification;

designating, by the processor of the EAS system, the RFID tag as a stray tag responsive to the chatter score being above a chatter score threshold;

omitting, by the processor of the EAS system, the RFID tag designated as the stray tag from further processing;

selecting, by the processor of the EAS system, the RFID identification based at least in part on the chatter score being below the chatter score threshold;

determining, by the processor of the EAS system, a plurality of input values for the RFID tag, each input value of the plurality of input values corresponding to a temporal and/or sessional feature associated with a machine learning model;

filtering, by the processor of the EAS system, the RFID tag for passing the RFID tag to a next stage or ceasing further processing of the RFID tag responsive to a result of determining whether the RFID tag is in motion or stationary that is based at least in part on the plurality of input values and the machine learning model; and triggering, by the processor of the EAS system, an alarm based on a determination that the RFID tag identified is moving and is not authorized to leave a controlled area associated with one or more of the plurality of RFID readers.

23. The method of claim 1, further comprising:

designating, by the processor of the EAS system, the RFID tag for the further processing responsive to the chatter score being below the chatter score threshold.

24. The method of claim 1, further comprising filtering, by the processor of the EAS system, the RFID tag for passing to a next stage or ceasing processing based on the chatter score.

25. The method of claim 22, further comprising:

passing, by the processor of the EAS system, the RFID tag to the next stage responsive to the result indicating the RFID tag is in motion; and ceasing, by the processor of the EAS system, the further processing of the RFID tag responsive to the result indicating the RFID tag is stationary.

* * * * *